US010976969B2

(12) United States Patent
Iida et al.

(10) Patent No.: US 10,976,969 B2
(45) Date of Patent: Apr. 13, 2021

(54) IMAGE FORMING APPARATUS HAVING TRANSFER ORDER CAPABILITY, SYSTEM, CONTROL AND METHOD THEREOF

(71) Applicant: CANON KABUSHIKI KAISHA, Tokyo (JP)

(72) Inventors: Toshihiko Iida, Toride (JP); Yoshiji Kanamoto, Tokyo (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/519,670

(22) Filed: Jul. 23, 2019

(65) Prior Publication Data

US 2020/0034090 A1 Jan. 30, 2020

(30) Foreign Application Priority Data

Jul. 27, 2018 (JP) .............................. JP2018-141633

(51) Int. Cl.
*G06F 3/12* (2006.01)

(52) U.S. Cl.
CPC ............ *G06F 3/1208* (2013.01); *G06F 3/127* (2013.01); *G06F 3/1238* (2013.01); *G06F 3/1253* (2013.01); *G06F 3/1286* (2013.01)

(58) Field of Classification Search
None
See application file for complete search history.

(56) References Cited

U.S. PATENT DOCUMENTS

| 9,058,555 B2 | 6/2015 | Kanamoto et al. |
| 10,061,544 B2 | 8/2018 | Kanamoto |
| 2006/0039707 A1* | 2/2006 | Mima ................ G03G 15/5083 399/23 |

(Continued)

FOREIGN PATENT DOCUMENTS

JP 2014-219920 A 11/2014

OTHER PUBLICATIONS

Toshihiko Iida et al., U.S. Appl. No. 16/521,992, filed Jul. 25, 2019.

(Continued)

*Primary Examiner* — Mohammad H Ghayour
*Assistant Examiner* — Pawan Dhingra
(74) *Attorney, Agent, or Firm* — Venable LLP

(57) ABSTRACT

A system includes an information processing apparatus that requests access to a file system managed by an image forming apparatus, receives a program for determining a transfer order of a plurality of print files designated by a screen and, in a case where a plurality of print files are stored in the folder via the displayed screen, executes the received program to determine a transfer order of the plurality of print files. The image forming apparatus, when the request is accepted, generates the program in accordance with a predetermined condition designated in advance by a user, and transmits the screen information and the generated program to the information processing apparatus, and executes image formation, which is based on a print file transferred in association with the folder and uses the print setting information, in an order in which the print file is transferred.

11 Claims, 27 Drawing Sheets

(56) References Cited

U.S. PATENT DOCUMENTS

| | | | | |
|---|---|---|---|---|
| 2006/0279780 A1* | 12/2006 | Anno | G06F 3/1285 | 358/1.15 |
| 2007/0086038 A1* | 4/2007 | Matsuzaki | G06F 3/1285 | 358/1.13 |
| 2008/0297833 A1* | 12/2008 | Hatakeyama | G06F 3/1253 | 358/1.15 |
| 2009/0273799 A1* | 11/2009 | Hanawa | G06F 3/1204 | 358/1.9 |
| 2014/0029048 A1* | 1/2014 | Arakawa | G06K 15/1888 | 358/1.15 |
| 2014/0168671 A1* | 6/2014 | Kanamoto | G06F 3/121 | 358/1.9 |
| 2016/0179439 A1* | 6/2016 | Kanamoto | G06F 3/1282 | 358/1.15 |
| 2016/0378408 A1* | 12/2016 | Asano | G06F 3/1205 | 358/1.15 |

OTHER PUBLICATIONS

Yoshiji Kanamoto et al., U.S. Appl. No. 16/523,253, filed Jul. 26, 2019.

* cited by examiner

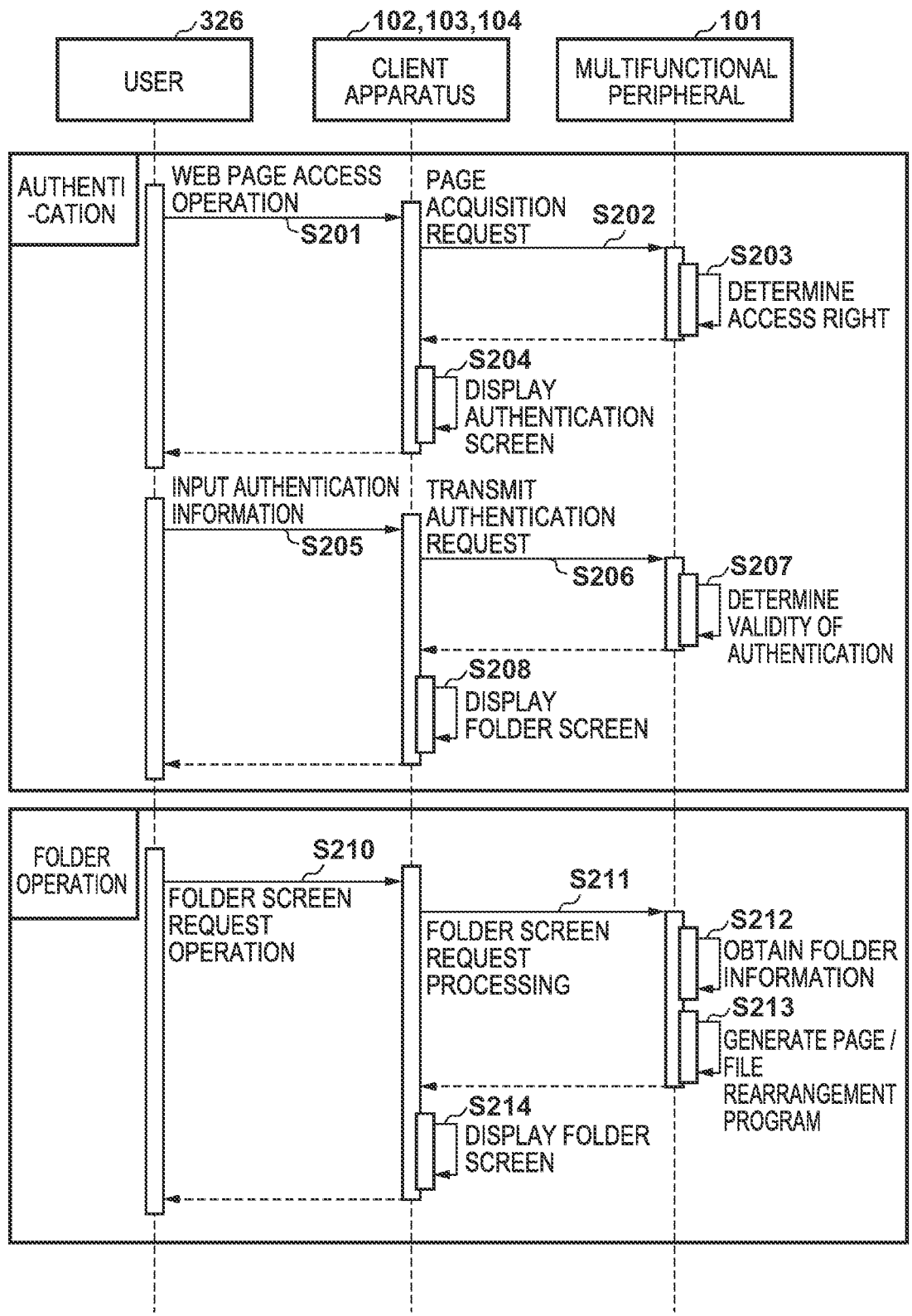

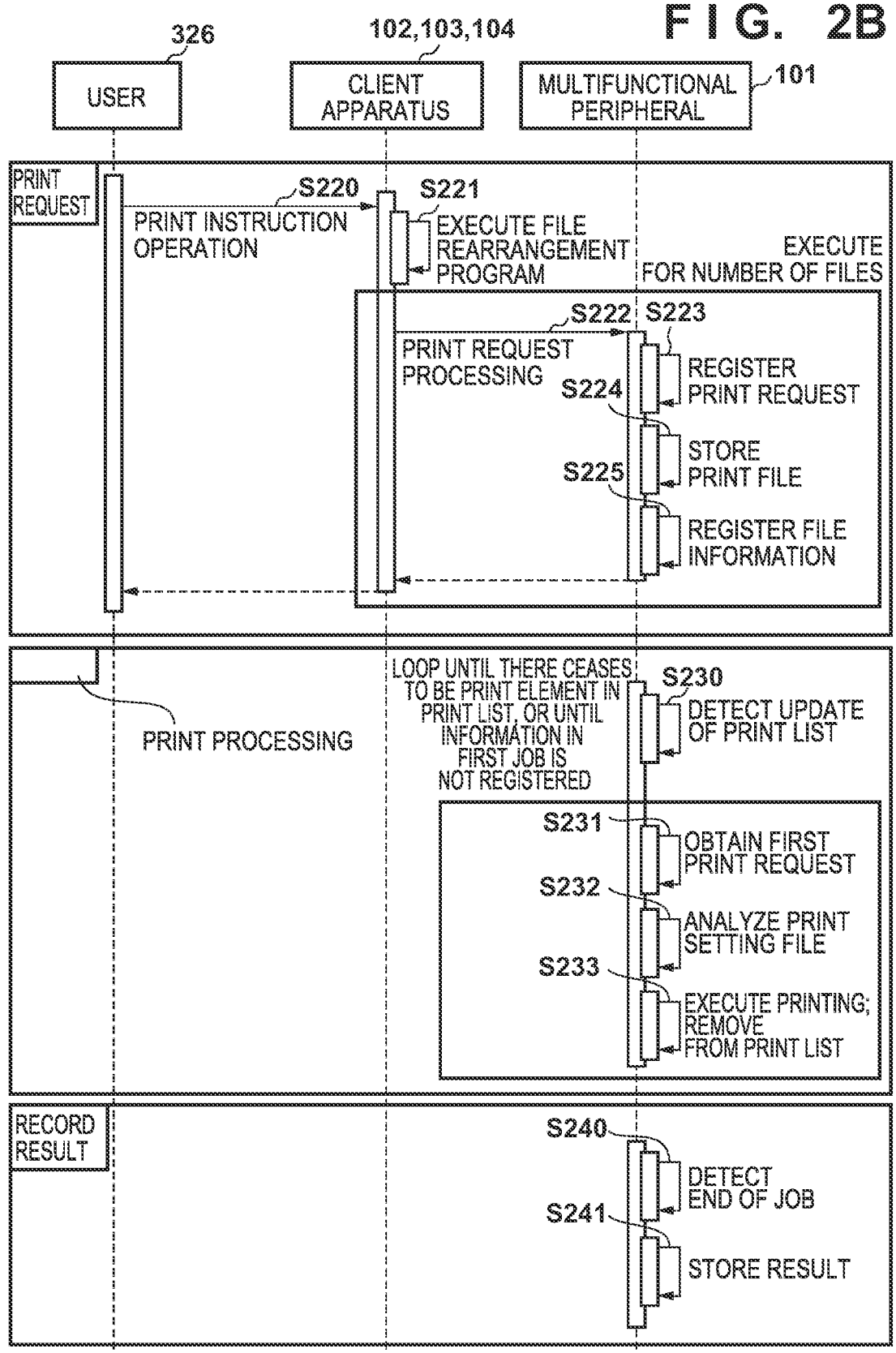

FIG. 4B

| | |
|---|---|
| BOOT LOADER | ~601 |
| OPERATING SYSTEM | ~602 |
| NETWORK CONTROL PROGRAM | ~603 |
| FILE SYSTEM SERVER | ~604 |
| WEB SERVER | ~605 |
| HOT FOLDER FUNCTION PROGRAM | ~606 |
| JDF FUNCTION PROGRAM | ~607 |
| PDL PRINT FUNCTION PROGRAM | ~608 |
| MEDIA MANAGEMENT PROGRAM | ~609 |
| USER AUTHENTICATION PROGRAM | ~610 |
| PRINT JOB QUEUE MANAGEMENT PROGRAM | ~611 |
| OTHER PROGRAMS | ~612 |

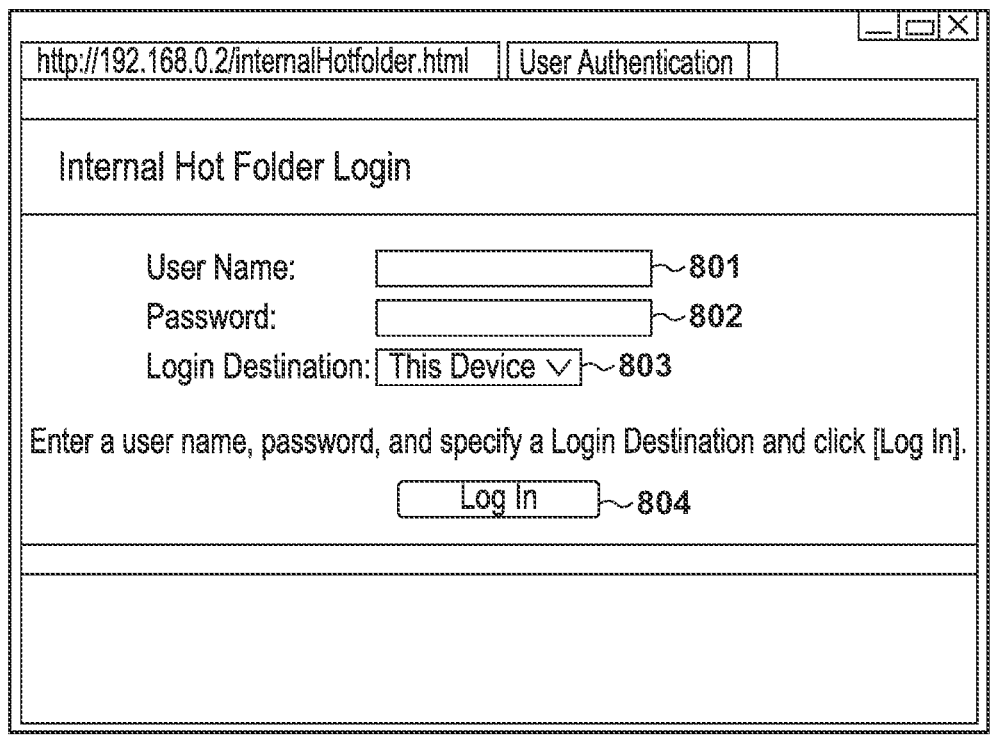
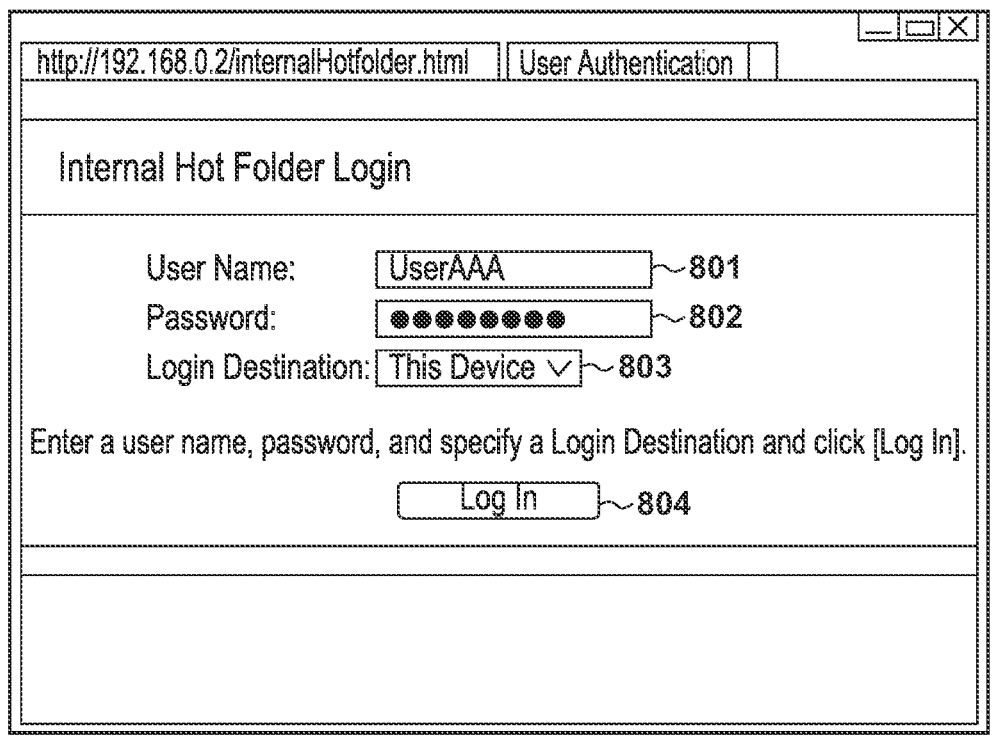

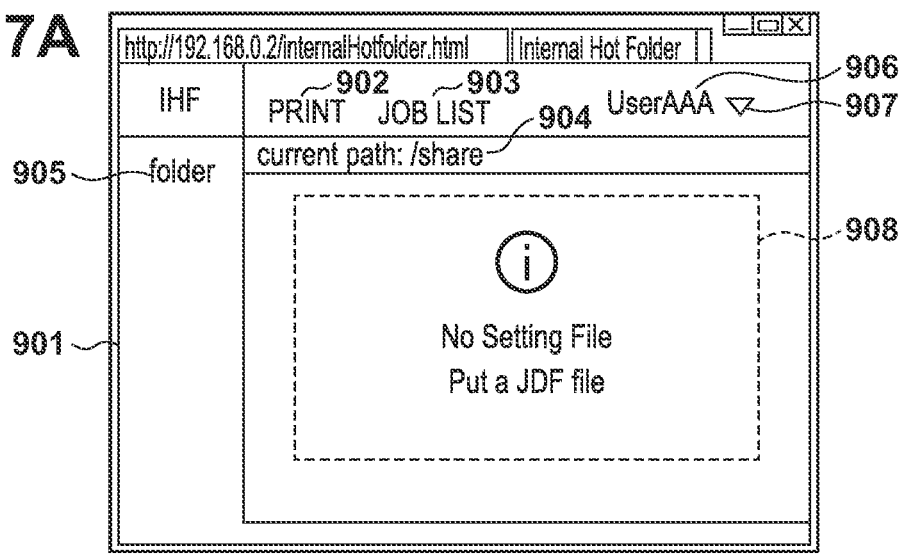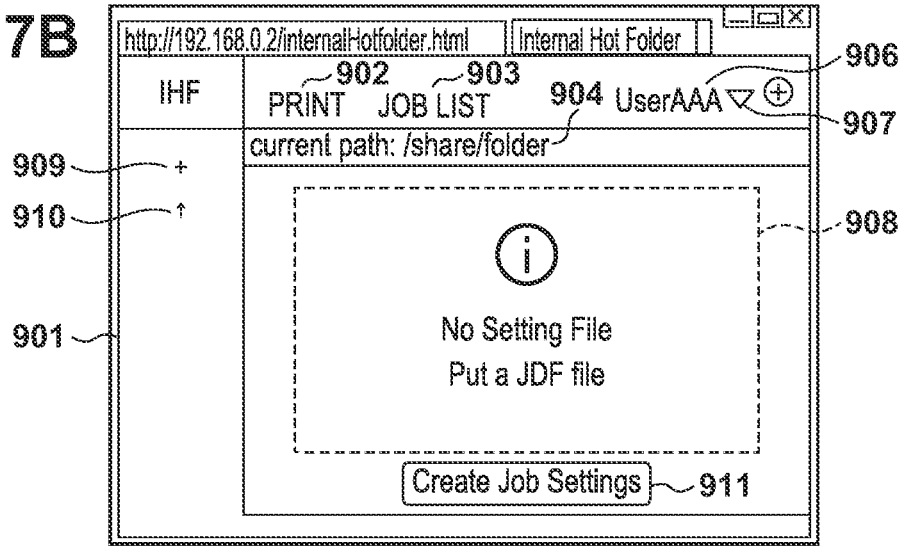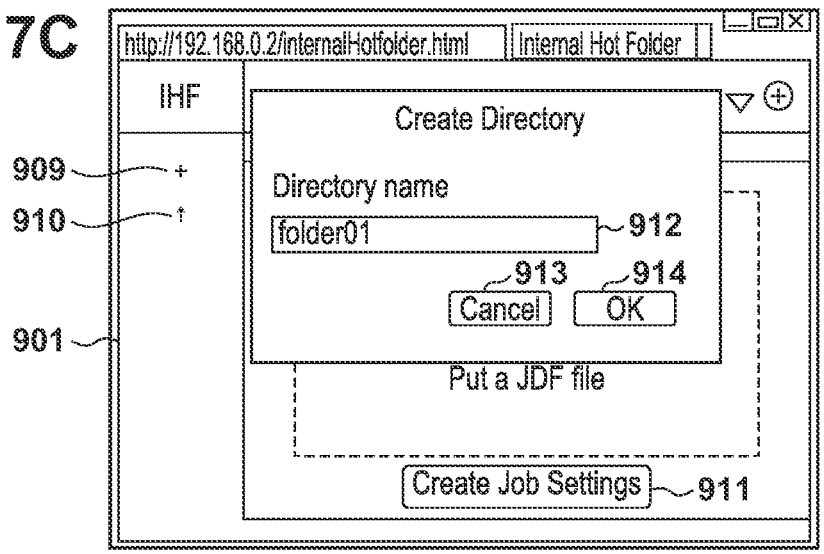

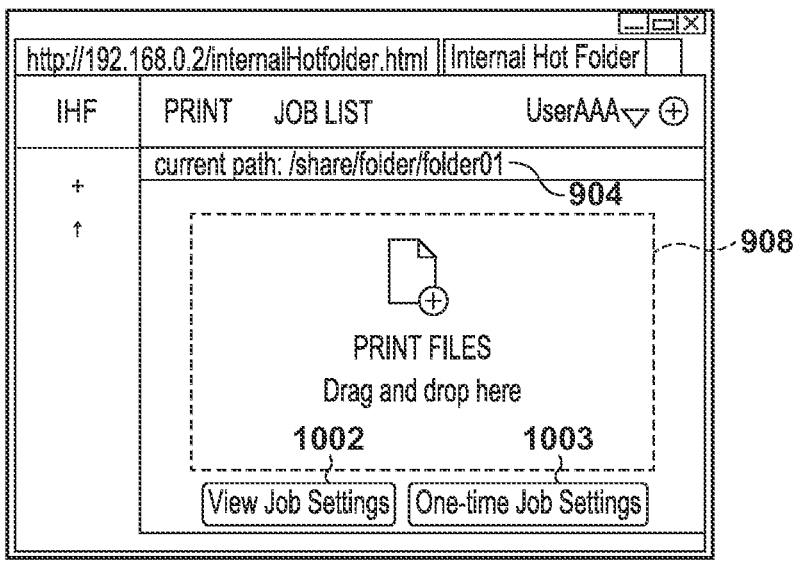

FIG. 8D

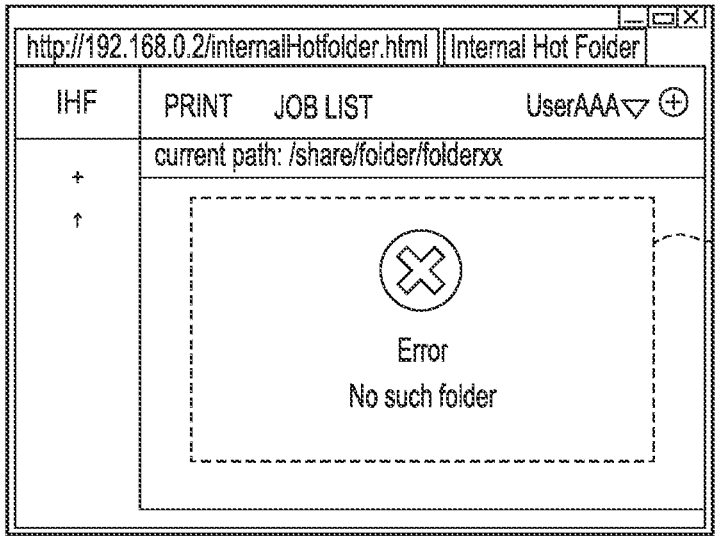

```
<?xml version='1.0'?>   ～1006
<JobSettings>   ～1007
    <MetaData>
        <FolderPath>/share/folder/folder01</FolderPath>   ～1004
    </MetaData>
    <PrintSettings>   ～1008
        <Copies>1</Copies>
        <Media>
            <MediaSize>A4</MediaSize>
            <MediaType>Auto</MediaType>
            <Location>Auto</Location>
        </Media>
        <Collate>SheetSetAndJob</Collate>
        <Disjointing>
            <OffsetDirection>None</OffsetDirection>
        </Disjointing>
    </PrintSettings>
    <LayoutSettings>   ～1009
        <Sides>OneSidedFront</Sides>
    </LayoutSettings>
</JobSettings>
```
～1005

FIG. 9B

```xml
<?xml version="1.0" encoding="UTF-8" standalone="no"?>
<JDF xmlns="http://www.CIP4.org/JDFSchema_1_1"
     xmlns:cj="http://www.canon.com/ns/CanonJDF" Activation="Active"
     Category="DigitalPrinting" ICSVersions="IDP_L1-1.0 Base_L1-1.0"
     ID="ID01" JobID="JobID01" JobPartID="JobPartID01" MaxVersion="1.2"
     Status="Ready" Type="Combined"
     Types="LayoutPreparation Imposition Interpreting Rendering DigitalPrinting"
     Version="1.2" cj:OwnerName="1">
 <ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:Content00@hostname.com"/>
    </LayoutElement>
   </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" Collate="SheetSetAndJob" ID="IDDPP" Status="Available">
   <MediaRef rRef="MED_000"/>
   <Disjointing OffsetDirection="None"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available">
   <Location LocationName="AutoSelect"/>
  </Media> </ResourcePool>
 <ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Input" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink CombinedProcessIndex="4" Usage="Input" rRef="IDDPP"/>
  <ComponentLink Amount="1" CombinedProcessIndex="4" Usage="Output" rRef="IDC_DPP"/>
  <MediaLink CombinedProcessIndex="4" Usage="Input" rRef="MED_000"/>
 </ResourceLinkPool>
</JDF>
```

1110

F I G. 11A

```
function sortFileOrderByName(fileNames) {
    var original = fileNames.slice(0, fileNames.length);

fileNames.sort (function(a, b) {
        a = a.toString().toLowerCase();
        b = b.toString().toLowerCase();
        if (a < b) {
            return -1;
        } else if (a > b) {
            return 1;
        }
        return 0;
    });

return getOrderToPrint(original, fileNames);
}
```
~1300

F I G. 11B

```
function sortFileOrderByDate(fileDate){
    var original = fileDate.slice(0, fileDate.length);

fileDate.sort (function(a,b) {
        return (a < b ? 1 : -1);
    });

return getOrderToPrint(original, fileDate);
}
```
~1310

F I G. 11C

```
function sortFileOrderBySize(fileSize){
    var original = fileSize.slice(0, fileSize.length);

fileSize.sort (function(a, b){
        return a - b;
    });

return getOrderToPrint(original, fileSize);
}
```
~1320

FIG. 11D

```
function getOrderToPrint(original, sorted) { var fileOrder = new Array();

var num = 0;
    for (var i = 0; i < sorted.length; i++) {
        for (var k = 0; k < original.length; k++) {
            if (sorted[i] == original[k]) {
                if (! isAlreadyAdded(fileOrder, k)) {
                    fileOrder [num] = k;
                    num ++;
                    break;
                }
            }
        }
    } return fileOrder;
}
```
~1330

FIG. 11E

```
function isAlreadyAdded(fileOrder, toAdd) {
    for (var i = 0; i < fileOrder.length; i++) {
        if (fileOrder[i] == toAdd) {
            return true;
        }
    }
    return false;
}
```
~1340

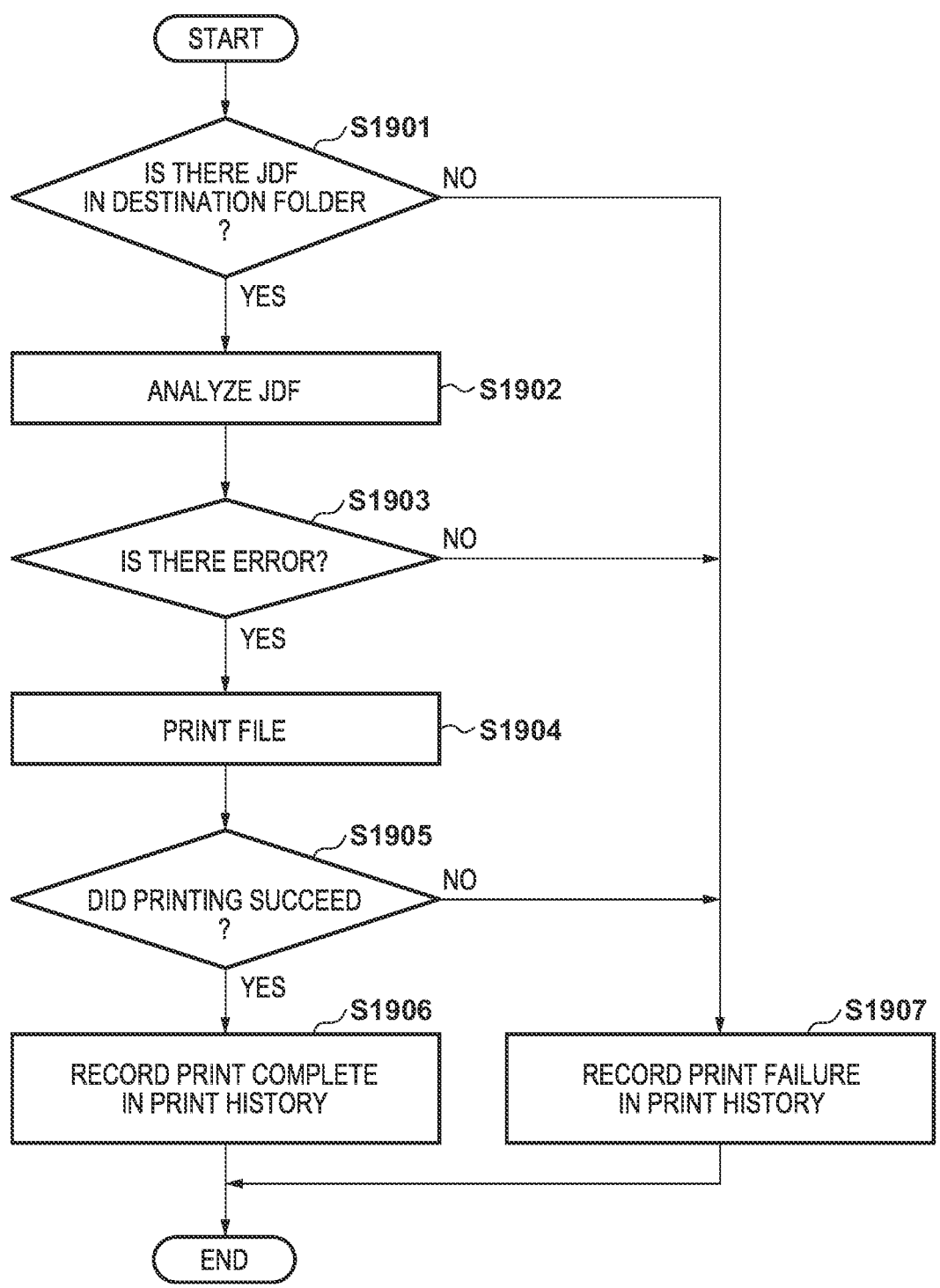
F I G. 17

F I G. 18B

| TRANSMISSION ORDER | DO NOT SORT | FILE NAME ORDER | FILE SIZE ORDER | LAST UPDATE DATE/TIME ORDER |
|---|---|---|---|---|
| 1 | booklet023.pdf | 20180222_2312.pdf | handout.pdf | booklet023.pdf |
| 2 | document41.pdf | booklet023.pdf | booklet023.pdf | handout.pdf |
| 3 | handout.pdf | document41.pdf | document41.pdf | document41.pdf |
| 4 | 20180222_2312.pdf | handout.pdf | 20180222_2312.pdf | 20180222_2312.pdf |

FIG. 19A

| ID | DESTINATION FOLDER PATH | USER NAME | FILE NAME | FILE PATH |
|---|---|---|---|---|
| 101 | /share/folder/folder01 | Sato | marketing_materials.pdf | /share/folder/folder01/marketing_materials.pdf |
| 102 | /share/folder/folder02 | Koide | 20180222_2312.pdf | |

FIG. 19B

| ID | DESTINATION FOLDER PATH | USER NAME | FILE NAME | FILE PATH |
|---|---|---|---|---|
| 102 | /share/folder/folder02 | Koide | 20180222_2312.pdf | |

FIG. 19C

| ID | DESTINATION FOLDER PATH | USER NAME | FILE NAME | FILE PATH |
|---|---|---|---|---|
| 102 | /share/folder/folder02 | Koide | 20180222_2312.pdf | /share/folder/folder02/20180222_2312.pdf |

FIG. 19D

| ID | DESTINATION FOLDER PATH | USER NAME | FILE NAME | FILE PATH |
|---|---|---|---|---|
| 102 | /share/folder/folder02 | Koide | 20180222_2312.pdf | share/folder/folder02/20180222_2312.pdf |
| 103 | /share/folder/folder02 | Koide | booklet023.pdf | |

IMAGE FORMING APPARATUS HAVING TRANSFER ORDER CAPABILITY, SYSTEM, CONTROL AND METHOD THEREOF

BACKGROUND OF THE INVENTION

Field of the Invention

The present invention relates to an image forming apparatus, a system, a method of controlling the same, and a storage medium.

Description of the Related Art

Preparing a hot folder in a client apparatus for causing an image forming apparatus such as a printer to execute print processing, and when a print target file is stored in the hot folder, automatically transmitting a print job to the printer to cause the printer to print the print job is known conventionally (Japanese Patent Laid-Open No. 2014-219920). With a hot folder, a user of the client apparatus can instruct printing by a relatively simple operation of storing a print target file. Therefore, when making an instruction to print a large amount of print data (many files) with the same print setting for example, the user can be relieved from the complexity of opening individual files using an application such as a printer driver and instructing printing.

Further, in recent years, instead of having the hot folder described above as an application that operates on a client apparatus, a mechanism for providing, as a function of an image forming apparatus such as a printer, an equivalent function—in other words an in-device hot folder—is also known. The in-device hot folder is a mechanism in which a file system and a file server included in the image forming apparatus expose a shared folder to an external client apparatus, and the client apparatus stores a print target file in the shared folder, thereby executing printing. The in-device hot folder can provide further convenience to a user while they enjoy the same operability and convenience as a hot folder operating in a client apparatus. First, there is no need to install an application for implementing the hot folder function on the client apparatus. Second, if a mechanism for accessing the file system of the image forming apparatus is provided, a print environment independent of the operating system can be realized. Third, since print settings of the hot folder are held in the image forming apparatus, there is no need to individually hold or manage hot folder print settings in each client apparatus.

However, there is a problem in the foregoing conventional technique as is described below. For example, in the above-mentioned conventional technique, provision of a print target file from a client apparatus to the file system of the image forming apparatus is realized by a program for realizing the hot folder function constantly monitoring the hot folder. In this method, when a plurality of files are put into a hot folder at once, the order in which they are printed depends on the behavior of the client apparatus system. That is, when a plurality of files are put into a folder, because the order in which the files are transferred depends on the behavior of the client apparatus file system, there may be a case where the files cannot be printed in an order intended by a user. For example, there may be a case where the files are not all present at the timing when the program inspects the folder. Although there little effect even if the order in which files are moved is back and forth in the case of a normal file operation, if the order of output of printed matter is changed, a user will need to manually rearrange printed matter after printing, which leads to an increase in an amount of work and errors.

SUMMARY OF THE INVENTION

The present invention enables realization of a mechanism for, regarding a print job using a predetermined folder for automatically transmitting a print target file to a printing apparatus when the print target file is stored therein, when a plurality of print target files are collectively stored, printing in an order intended by a user, independent of the behavior of the apparatus having the folder.

One aspect of the present invention provides an image forming apparatus comprising: a memory device that stores a set of instructions and a folder with which print setting information is associated; an image forming unit configured to form an image on a sheet; and at least one processor that executes the set of instructions to: transmit, to an external apparatus, screen information for causing the external apparatus to display a screen, which is for accepting a designation of a print file to be transferred to the image forming apparatus in association with the folder and is capable of simultaneously accepting a designation of a plurality of print files, and a program for determining a transfer order of the plurality of print files designated on the screen; cause the image forming unit to execute image formation, which is based on print files that have been transferred in association with the folder and uses the print setting information, in an order in which the print files have been transferred.

Another aspect of the present invention provides a control method of an image forming apparatus equipped with a memory operable to provide a folder with which print setting information is associated, and an image forming unit operable to form an image on a sheet, the method comprising: transmitting, to an external apparatus, screen information for causing the external apparatus to display a screen, which is for accepting a designation of a print file to be transferred to the image forming apparatus in association with the folder and is capable of simultaneously accepting a designation of a plurality of print files, and a program for determining a transfer order of the plurality of print files designated on the screen; and causing the image forming unit to execute image formation, which is based on print files that have been transferred in association with the folder and uses the print setting information, in an order in which the print files have been transferred.

Still another aspect of the present invention provides a non-transitory computer-readable storage medium storing a computer program for causing a computer to execute each step in a control method of an image forming apparatus equipped with a memory operable to provide a folder with which print setting information is associated and an image forming unit operable to form an image on a sheet, the control method comprising: transmitting, to an external apparatus, screen information for causing the external apparatus to display a screen, which is for accepting a designation of a print file to be transferred to the image forming apparatus in association with the folder and is capable of simultaneously accepting a designation of a plurality of print files, and a program for determining a transfer order of the plurality of print files designated on the screen; and causing the image forming unit to execute image formation, which is based on a print file transferred in association with the folder and uses the print setting information, in an order in which the print file is transferred.

Yet still another aspect of the present invention provides a system in which an information processing apparatus and an image forming apparatus can communicate, wherein the information processing apparatus comprises: a first memory device that stores a set of instructions; and at least one first processor that executes the set of instructions to: request access to a file system managed by the image forming apparatus; as a response to the request, receive screen information for causing an external apparatus to display a screen, which is for accepting designation of a print file to be transferred to the image forming apparatus in association with a folder and is capable of accepting designation of a plurality of print files at the same time, and a program for determining a transfer order of the plurality of print files designated by the screen; display the screen on a web browser in accordance with the screen information; and in a case where a plurality of print files are stored in the folder via the displayed screen, use the program to determine a transfer order of the plurality of print files, and the image forming apparatus comprises: a second memory device that stores a set of instructions and a folder with which print setting information is associated; an image forming unit configured to form an image on a sheet; and at least one second processor that executes the set of instructions to: in a case where a request is accepting by the requesting unit, transmit the screen information and the program to the information processing apparatus; and cause the image forming unit to execute image formation, which is based on a print file transferred in association with the folder and uses the print setting information, in an order in which the print file is transferred.

Still yet another aspect of the present invention provides a method for controlling a system in which an information processing apparatus and an image forming apparatus, which includes a memory operable to provide a folder with which print setting information is associated and an image forming unit operable to form an image on a sheet, can communicate with each other, wherein the information processing apparatus comprises: requesting access to a file system managed by the image forming apparatus; as a response to the requesting, receiving screen information for causing an external apparatus to display a screen, which is for accepting designation of a print file to be transferred to the image forming apparatus in association with a folder and is capable of accepting designation of a plurality of print files at the same time, and a program for determining a transfer order of the plurality of print files designated by the screen; displaying the screen on a web browser in accordance with the screen information, in a case where a plurality of print files are stored in the folder via the displayed screen, determining a transfer order of the plurality of print files using the program, and image forming apparatus comprising: upon accepting the request, transmitting the screen information and the program to the information processing apparatus; causing the image forming unit to execute image formation, which is based on print files that have been transferred in association with the folder and uses the print setting information, in an order in which the print files have been transferred.

Further features of the present invention will be apparent from the following description of exemplary embodiments with reference to the attached drawings.

BRIEF DESCRIPTION OF THE DRAWINGS

FIGS. 2A and 2B are sequence diagrams of the entire system.

FIGS. 4A and 4B are block diagrams illustrating a configuration of a multifunctional peripheral 101.

FIGS. 6A and 6B are views showing examples of a web page having a login function that is to be displayed on a web browser 705.

FIGS. 7A-7E are views showing examples of web pages, to be displayed on the web browser 705, that have a function of hierarchically displaying and creating folders.

FIGS. 8A-8F are views showing examples of web pages having a print setting creation function that are to be displayed on the web browser 705.

FIGS. 9A-9C are schematic diagrams of a folder configuration created in a HDD 404 of the multifunctional peripheral 101.

FIGS. 11A-11E are views showing examples of a file sorting program executed when a print instruction operation with respect to a plurality of files is accepted.

FIG. 17 is a flow chart showing a sequence of processing by the CPU 401 in print processing.

FIGS. 18A and 18B are views for explaining an operation for instructing a print request for a plurality of files and the transmission order of the files according to the present invention.

FIGS. 19A-19D are schematic diagrams showing changes in a print list stored in a RAM 402.

DESCRIPTION OF THE EMBODIMENTS

Figure 1:
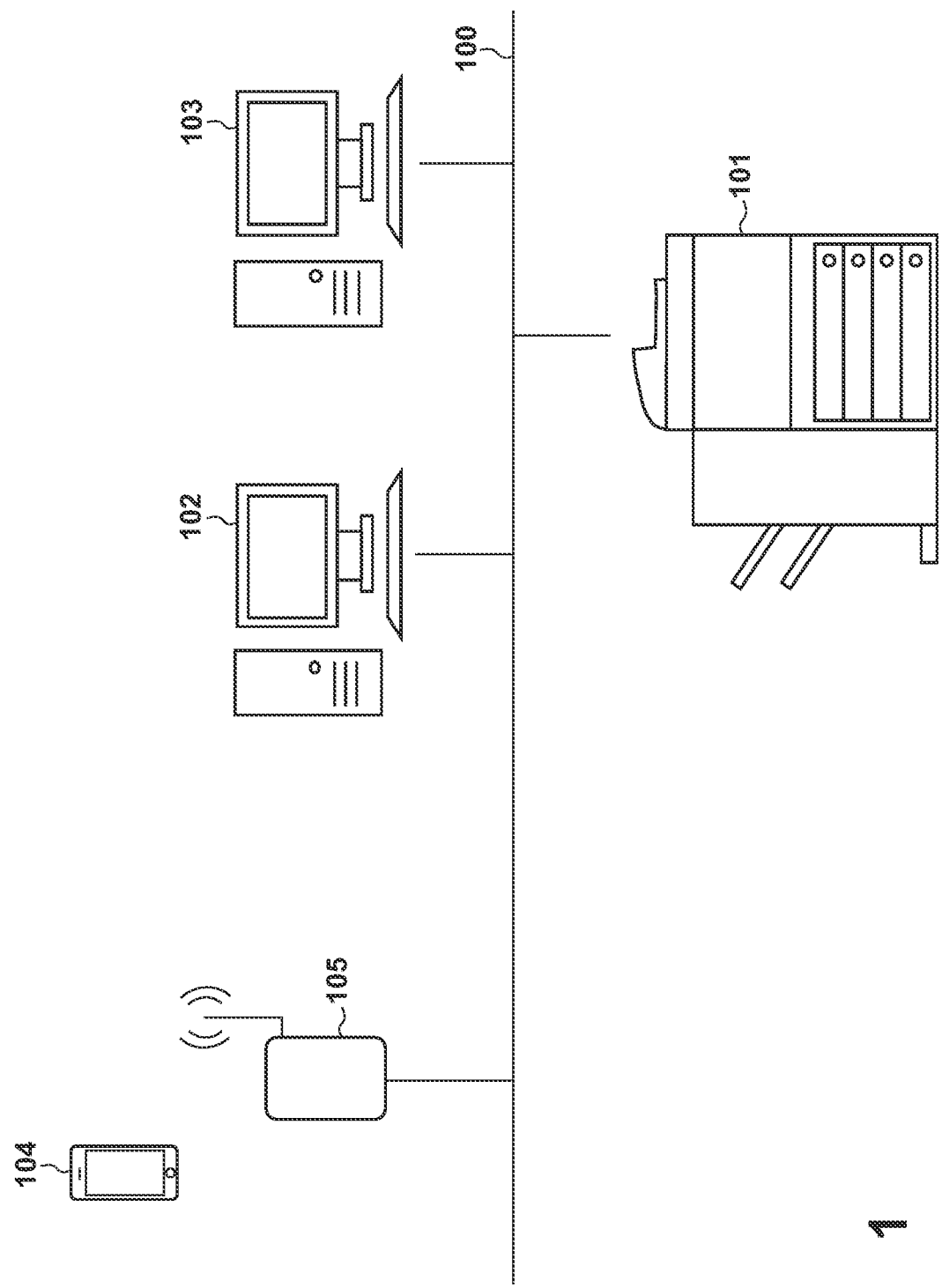
FIG. 1 is a block diagram of a printing system.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that description is given by taking a multifunctional peripheral (digital multifunctional peripheral/MFP/multi function peripheral) as an example of an image forming apparatus according to an embodiment. However, application is not limited to a multifunctional peripheral, and may be to any apparatus that has an image processing function.

First Embodiment

<Configuration of Printing System>

Description is given below regarding a first embodiment of the present invention, with reference to the attached drawings. First, a configuration of a printing system according to the present embodiment will be described with reference to FIG. 1. In the present embodiment, description is given by example in which a multifunctional peripheral 101 (MFP: Multifunction Peripheral) is taken as an example of an image forming apparatus, and a PC or a mobile terminal is taken as an example of a client apparatus which is an information processing apparatus. The multifunctional peripheral 101 and PCs 102 and 103 are communicably connected via a network 100. The PCs 102 and 103 may be systems that operate in accordance with different operating systems. Alternatively, they may be systems that have different versions of the same operating system. In the present embodiment, a printing system environment in which types of client apparatus application execution environments are mixed is assumed.

Further, a wireless LAN access point 105 is connected to the network 100. The wireless LAN access point 105 is configured to be able to communicate with a mobile terminal 104 and various other types of devices (not shown) via a wireless LAN. In this embodiment, devices of a type such as the mobile terminal 104, as a client apparatus equivalent to the PCs 102 and 103, may also be provided with the print environment described below. Such a mobile terminal 104 is rapidly becoming popular, and product diversification is significant. Further, with the popularization of such portable terminals, it is also assumed that, for example, the client apparatus of a user requesting printing from the multifunctional peripheral 101 disposed on the network 100 illustrated in the figure may be a device taken from a public environment.

Next, the PCs 102 and 103 and the mobile terminal 104, which are client apparatuses, will be described. Hereinafter, the PCs 102 and 103, and the mobile terminal 104 are generally referred to as a client apparatus.

The PCs 102 and 103 can execute various programs such as an application program for inputting print jobs. However, in the present embodiment, it is assumed that a printing application program is not installed. It is also assumed that the PCs 102 and 103 have a network file sharing function and a web-information-access function such as a web browser, which are ordinarily present on a modern operating system. By using the above-described the web-information-access function, a client apparatus can use the functions of, via the web, mutually transmitting and receiving information and sharing information with a device connected to the network 100. Therefore, the client apparatus can transmit and receive various kinds of data including print target files to and from the multifunctional peripheral 101 by using the web-information-access function.

<Sequence Diagram of the Entire Printing System>

Next, referring to FIG. 2A and FIG. 2B, a description will be given regarding a sequence in which a user 326 authenticates, moves a folder, and instructs printing of a plurality of files, and the files are actually printed. Processing starts when the user 326 shown in FIG. 3 operates a UI unit 301 and requests access to a web server unit 328. Since there is no difference in configuration or control for each client apparatus, description is given taking one device as an example.

First, FIG. 2A will be described. The processing of steps S201 to S208 is a processing flow for when the user 326 operates a web browser app unit 302 via an operation unit 327 of the client apparatus and performs a web page access operation on a web server unit 328 of the multifunctional peripheral 101. A process of authenticating an operator (a user) is executed by an authentication unit 304 via the web server unit 328. Screens to be displayed on the UI unit 301 in the authentication process will be described later with reference to FIGS. 8A-8F.

In step S201, when the user 326 performs an operation on the UI unit 301 of the client apparatus, the web browser app unit 302 of the client apparatus accepts the operation which is for displaying a web page. This is an operation for instructing acquisition of a web page provided by the in-device hot folder, and specifically, an operation such as inputting an address or selecting a link is performed. Next, in step S202, the web browser app unit 302 performs a page acquisition request to the multifunctional peripheral 101 for an accepted URL. This processing is a normal Web browser process, and is performed by a GET request or the like.

Next, in step S203, the web server unit 328 of the multifunctional peripheral 101 acquires information of the user 326 from the received page acquisition request and determines whether or not they have a right (access right) to access the designated URL. The user 326 can acquire an access right by performing login authentication. The web server unit 328 transmits information of an authentication screen for performing login authentication, if the user has an access right, to the client apparatus.

Next, in step S204, the web browser app unit 302 displays the authentication screen on the UI unit 301 according to the screen information received from the web server unit 328. Next, in step S205, when the user 326 inputs authentication information to the authentication screen displayed on the UI unit 301, the web browser app unit 302 accepts the input information. Thereafter, in step S206, the web browser app unit 302 transmits an authentication request to a URL described in the web page of the authentication screen. The authentication request includes the authentication information inputted from the user 326. Normally, the authentication request is transmitted in an encrypted form.

In step S207, the web server unit 328 acquires the authentication information from the received authentication request, and queries the authentication unit 304 of the multifunctional peripheral 101 as to whether or not the authentication information is valid. The authentication unit 304 compares information of a user DB 305 with the accepted authentication information, and returns a result. If the result from the authentication unit 304 indicates successful authentication, the web server unit 328 notifies the web browser app unit 302 of information of a folder screen together with the authentication result. In step S208, the web browser app unit 302 displays, on the UI unit 301, the folder screen according to the screen information received from the web server unit 328. The folder screen displayed here is a screen of the folder of the highest hierarchy in the hot folder.

Next, a sequence of processing of folder operations shown in step S210 to step S214 will be described. Here, the processing is started from a point where the user 326 operates the folder screen displayed on the UI unit 301 to perform an operation for requesting a folder screen. Folder screens and operations on these screens will be described later using FIGS. 7A to 7E.

In step S210, the web browser app unit 302 of the client apparatus accepts the operation of requesting the folder screen performed by the user 326 operating the folder screen displayed on the UI unit 301. This operation is an operation of any destination folder designation button, an operation of an upper hierarchical movement button 910 shown in FIG. 7A, an operation of designating an address including a folder path directly to the web browser app unit 302, or the like.

Next, in step S211, the web browser app unit 302 transmits a request to the web server unit 328 to acquire information of the designated address. Details will be described later with reference to FIGS. 13 and 14. Next, in step S212, the web server unit 328 of the multifunctional peripheral 101 detects a request for a folder screen. Further, the web server unit 328 acquires a folder path from the received folder screen request, and acquires a file list of the folder via the file system unit 329. Then, the web server unit 328 determines whether or not a file having a predetermined print setting file file extension is included in the acquired file list. Details will be described later with reference to FIG. 14.

Next, in step S213, the web server unit 328 generates a folder screen based on the acquired folder information by a page generation unit 306. Further, the web server unit 328 calls a hot folder function unit 321. The hot folder function unit 321 causes a program generation unit 331 to generate a file sorting program. The generated information is notified to the web browser app unit 302. Details will be described later with reference to FIGS. 10, 11A to 11E, and 14.

In step S214, the web browser app unit 302 displays the folder screen on the UI unit 301 according to the information received from the web server unit 328. The folder screen will be described later with reference to FIG. 8A to FIG. 8F.

Next, FIG. 2B will be described. A sequence of processing for a print request that is shown in steps S220 to S225 will be described. Here, processing is started by the user 326 operating a folder screen displayed on the UI unit 301 to execute a print instruction operation.

In step S220, the web browser app unit 302 accepts a print instruction operation performed by the user 326 via the folder screen displayed on the UI unit 301. This operation is, for example, an operation of dragging and dropping a file into a folder type display area 908 shown in FIG. 7A.

In step S221, the web browser app unit 302 executes the file sorting program. The file sorting program is a program for determining the order in which files are to be transmitted according to a setting of the user 326. Processing for steps S222 to S225 is executed as many times as the number of files designated by the print instruction operation, and one file is transmitted to the web server unit 328 in each round of processing. Processing for steps S223 to S225 will be described later in detail with reference to FIG. 15.

In step S222, the web browser app unit 302 performs processing for a print request with respect to the web server unit 328. This processing uses normal web browser functions, such as a POST request. The print request processing includes a file for which a print instruction was received, and the folder path of the folder screen. Subsequently, in step S223, the web server unit 328 of the multifunctional peripheral 101 detects the received print request, and calls the hot folder function unit 321 to register the print request in the print list stored in the RAM 402. An ID is added to the print request to be registered as information corresponding to the request, and the accepted folder path is included. Next, in step S224, the web server unit 328 reads the file from the print request, and stores the read file in the HDD 404 via the file system unit 329. Subsequently, in step S225, the hot folder function unit 321 adds the file path of the saved file to the print request which was registered in the print list in step S223.

Next, a sequence of processing for print processing shown in S230 to S233 will be described. The hot folder function unit 321 starts processing when it detects that the print list has been updated. Processing for steps S230 to S233 will be described later in detail with reference to FIGS. 16 to 17.

In step S230, the hot folder function unit 321 detects that the print list stored in the RAM 402 of the multifunctional peripheral 101 has been updated. The processing of steps S231 to S233 is repeatedly executed until there is no print request in the print list, or a file path for a first print request is not registered.

In S231, the hot folder function unit 321 acquires the first print request of the print list. When there is no print request in the print list, or when the file path of the first print request is not registered, the processing ends. Next, in step S232, the hot folder function unit 321 acquires the folder path from the print request, and acquires the print setting file in the folder through the file system unit 329. Further, a job registration requesting unit 323 analyzes the acquired print setting file.

Next, in step S233, the hot folder function unit 321 acquires the file path from the print request, and reads the file through the file system unit 329. The job registration requesting unit 323 transmits a job registration request to a job registering unit 320 using the result of the analysis in step S232 and the read file. At the same time, the print request is deleted from the print list stored in the RAM 402.

Next, a sequence of processing for recording the results shown in steps S240 and S241 will be described. Here, the processing is started from when a print queue management unit 319 detects the completion of printing. Processing for steps S240 and S241 will be described later in detail with reference to FIG. 15.

In step S240, the print queue management unit 319 detects print completion (job completion) from a printer unit 314 and notifies a print result management unit 332 of the print completion. Next, in step S241, the print result management unit 332 receives the print completion notification and registers a print result in a print history stored in the RAM 402.

<System Configuration>

Figure 3:
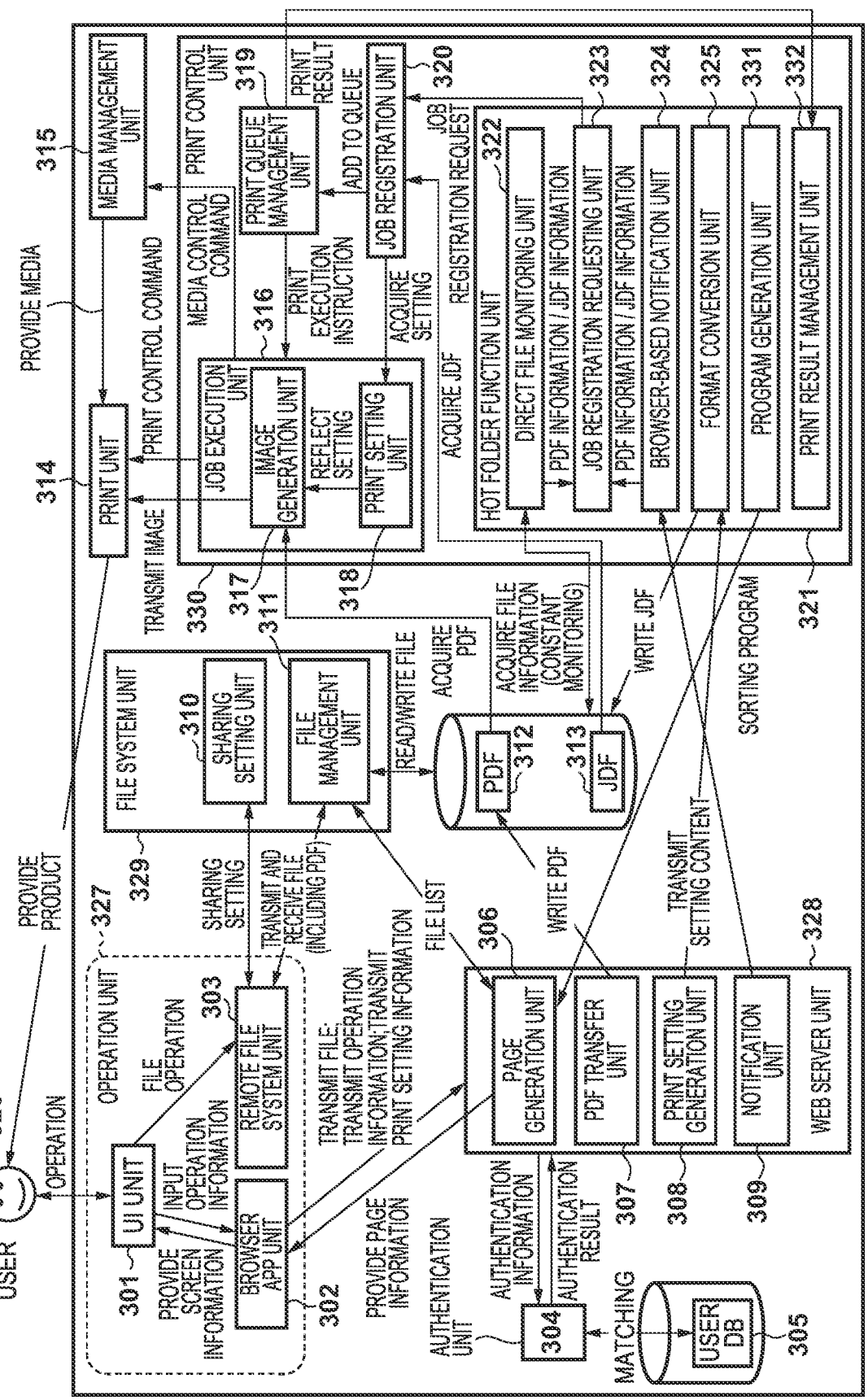
FIG. 3 is a system configuration diagram of an in-device hot folder.

Next, a functional configuration of the hot folder printing system according to the present embodiment will be described with reference to FIG. 3. As shown in FIG. 3, the printing system can be represented by a collection of a plurality of functional modules. Each module may be implemented by hardware or software. In addition, configuration may be taken such that some of the functional modules are arranged in an external server (not shown) and functionality is realized by communication with the external server. Note that the same reference numerals are used for portions common to those in FIG. 2, and descriptions thereof are omitted. Furthermore, functional modules which configure respective systems, processes of the functional modules, and relationships between functions will be described here.

The printing system includes the above-described operation unit 327, the web server unit 328, the file system unit 329, a print control unit 330, the printer unit 314, the authentication unit 304, and the like. The operation unit 327 includes the UI unit 301, the web browser app unit 302, and a remote file system unit 303. The UI unit 301 is a functional unit provided for instructing display of image information and input and output of data, and accepting an operation instructions. Content of an operation by the user 326 is reflected to the web browser app unit 302 and the remote file system unit 303.

The web browser app unit 302 is a functional unit that presents screen information by displaying web content on a window screen on the UI unit 301. The web browser app unit 302 performs processing for transmitting and receiving information to and from the web server unit 328, which will be described later. Screen information is mainly provided from the web browser app unit 302 to the UI unit 301.

The remote file system unit 303 is a functional unit for operating folders and files in the multifunctional peripheral 101 by using file system functionality provided by the client apparatus. The remote file system unit 303 accesses a file management unit 311 to perform various operations under the access right and based on the setting information of a sharing setting unit 310. Sharing setting information is exchanged between the remote file system unit 303 and the sharing setting unit 310. More specifically, the following operations are possible by using remote file system functionality. For example, this corresponds to execution of processing derived from a file system, such as the acquisition of information on a folder hierarchy, information on a path, list information of subfolders and files under a folder, folder creation/deletion processing, and file creation/deletion processing. Also, an in-device hot folder function includes, for example, processing for transmitting a file in a PDF format, which is print target data. However, as will be described later, the in-device hot folder in the present invention is characterized in that a print-related instruction is executed via the web server unit 328 instead of the operation unit 327 directly executing a print-related instruction with respect to the file system unit 329.

The web server unit 328 is a functional unit that the multifunctional peripheral 101 has, and is for providing a web service to an external apparatus. The web server unit 328 executes a series of processes for receiving various demands, that is, requests from an external apparatus, and returning a result of executing a process corresponding to the content of a request to the external apparatus in the form of page information.

The web server unit 328 includes the page generation unit 306, a PDF transfer unit 307, a print setting generation unit 308, and a notification unit 309. The page generation unit 306 is a module for generating page information for providing a result of executing an accepted request to an external apparatus. When the web server unit 328 receives a PDF-format file, which is print target data, from an external apparatus, the PDF transfer unit 307 executes processing to store the received file. More specifically, the file management unit 311 executes a process of storing a PDF 312 via the file system unit 329.

The print setting generation unit 308 is a module that executes a process for a case where the web server unit 328 receives from an external apparatus a request that includes print settings. This corresponds to a case where the web server unit 328 receives a set of print settings that corresponds to a folder in a hot folder creation process. In this case, the print setting generation unit 308 uses a format conversion unit 325 provided in the hot folder function unit 321 to make a conversion to a JDF-format file 313, and then stores the converted data via the file management unit 311 which is managed by the file system unit 329.

The program generation unit 331 generates a program to be provided to the client apparatus, such as the file sorting program to be described later. As described above, the print result management unit 332 receives a print completion notification from the print queue management unit 319, and registers a print result in the print history stored in the RAM 402.

The notification unit 309 is a module for generating a notification event between modules when the web server unit 328, triggered by accepting a web request from an external apparatus, executes a process inside the multifunctional peripheral 101. Specifically, the hot folder function unit 321 is a module that controls timings of the execution of a series of processes such as print processing, a folder hierarchy moving process, and processes for generating and replying with rendering information associated therewith, in response to requests received by the web server unit 328.

The web server unit 328, in conjunction with the authentication unit 304, is further capable of executing an authentication process for realizing user access control with respect to web services provided via the web server unit 328. When executing the authentication process, the web server unit 328 performs matching against the user DB 305 included in the authentication unit 304, based on the received user information, and determines whether authentication succeeded. Control is performed so that only when a user is successfully authenticated are they permitted to use various web services provided via the web server unit 328.

The print control unit 330 is a module responsible for a series of control for controlling the printer unit 314 and a media management unit 315 included in the multifunctional peripheral 101, performing image formation onto a sheet for print target data, and processing the sheet. The print control unit 330 is further divided into a plurality of sub modules such as a job execution unit 316, the print queue management unit 319, the job registering unit 320, and the hot folder function unit 321.

The job execution unit 316 is a module that collectively manages and executes print control that is generated in the multifunctional peripheral 101 in a unit of print data called a job. The print queue management unit 319 is a module for managing an execution order by adding an order to respective jobs managed by the job execution unit 316. The hot folder function unit 321 is a module for realizing a hot folder function. Print jobs generated by the hot folder function unit 321 are stored in the print queue management unit 319, via the job registering unit 320, in the order in which they were generated.

The print queue management unit 319 instructs the job execution unit 316 to execute the first job of jobs that the print queue management unit 319 manages. Specifically, first, an image generation unit 317 rasterizes image data such as the PDF 312, which is a print target of the job. A print setting unit 318 analyzes print settings and media settings written in the JDF (Job Definition Format) 313 or the like. Further, the job execution unit 316 controls the printer unit 314 and the media management unit 315, and performs a process of forming an image of the above rasterized image data on a sheet in accordance with analyzed commands. As a result, a series of product generation processes is executed. When the product generation process by the job execution unit 316 completes, the print queue management unit 319 is controlled to sequentially execute similar control for the next jobs. Such processes are controlled to be processed in order until all of the jobs managed by the print queue management unit 319 have been completed.

The hot folder function unit 321 is a module for realizing the in-device hot folder function in the multifunctional peripheral 101, and is a function provision unit. A function group configured by the in-device hot folder function provided by the hot folder function unit 321 includes a process related to creating a hot folder, a process related to executing an inputted print job, and a process of setting the in-device hot folder function itself. Further, the function group includes a process of presenting an operation screen to the operation unit 327 in order for these functions to be instructed.

Further, the in-device hot folder function of the present embodiment is characterized in that print target data is received via the web server unit 328. Therefore, execution of a print job is instructed by a browser-based notification unit 324 receiving a print processing execution trigger from the notification unit 309, which is managed by the web server unit 328, and the job registration requesting unit 323 registering it in the job registering unit 320.

<Configuration of Multifunctional Peripheral>

Figure 4A:
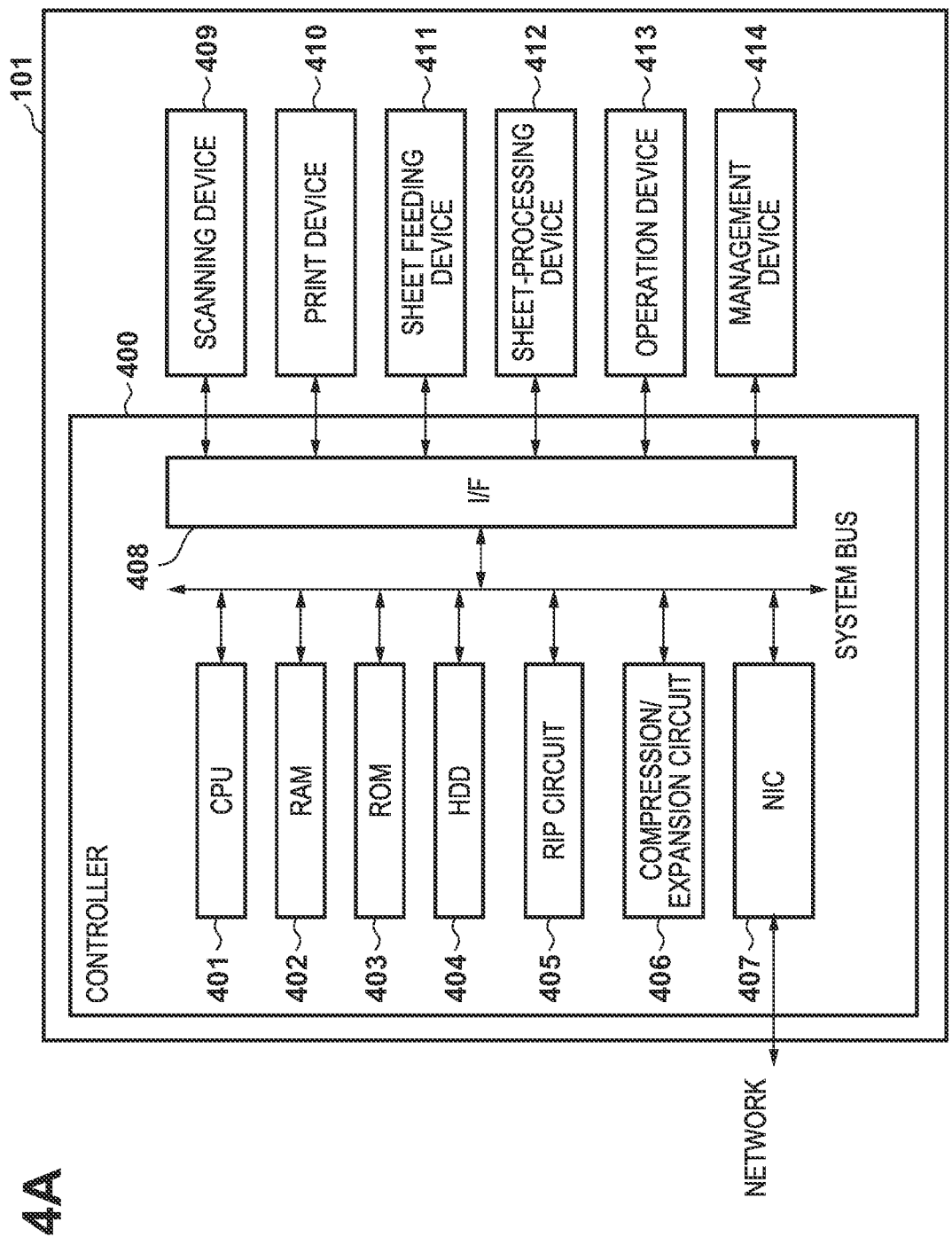

Next, referring to FIGS. 4A and 4B, the configuration of the multifunctional peripheral 101 will be described. FIG. 4A shows a hardware configuration of the multifunctional peripheral 101, and FIG. 4B shows a software configuration of the multifunctional peripheral 101. The multifunctional peripheral 101 has a reading function of reading an image on a sheet and a print function of printing an image onto a sheet. The multifunctional peripheral 101 has a post-processing function of binding a plurality of sheets onto which images have been printed, aligning a plurality of sheets, and dividing a discharge destination of a plurality of sheets among a plurality of trays. A sheet includes paper such as plain paper or cardboard, a film sheet, and the like.

Further, the multifunctional peripheral 101 has a file sharing function that can be used from a client apparatus such as the PCs 102 and 103, and the mobile terminal 104. The file sharing function that the multifunctional peripheral 101 has is configured to be usable through the web-information-access function described above. Details of the file sharing function, the web-information-access function, a program configuration for providing these functions in each device, and usage methods that involve these will be described later. It should be noted that the functionality of the multifunctional peripheral according to the present invention is not intended to be limited to these functions, and other functions, for example, a function of transmitting image data or the like, may be included.

The multifunctional peripheral 101 includes a controller 400, a scanning device 409, a print device 410, a sheet feeding device 411, a sheet-processing device 412, an operation device 413, and an external storage 414. The controller 400 includes a CPU 401, a RAM 402, a ROM 403, a HDD 404, a RIP circuit 405, a compression/expansion circuit 406, a NIC 407, and an interface 408. The multifunctional peripheral 101 is a device for conveying a medium (e.g., paper or sheet) contained in the sheet feed unit, and forming an image of expanded image data onto the medium using toner. Configuration is such that apparatuses having a plurality of different roles are connected to each other so as to enable complicated sheet processing.

The multifunctional peripheral 101 according to the present invention includes a non-volatile memory such as the hard disk drive (also referred to below as HDD) 404 that is capable of storing data of a plurality of jobs that are to be processed in the device. In the present embodiment, description is given by taking as an example the multifunctional peripheral 101 which uses a hard disk, but there is no limitation to a hard disk as long as there is a similar large-capacity non-volatile storage apparatus. The multifunctional peripheral 101 is provided with a copying function for printing, by the print device 410 and via the HDD 404, job data accepted from the scanning device 409. Further, the multifunctional peripheral 101 is provided with a print function of printing job data accepted from an external apparatus via the interface 408 by the print device 410 via the HDD 404, and the like. The multifunctional peripheral 101 according to the present invention is an MFP-type printing apparatus (also referred to as an image forming apparatus) having a plurality of functions. As long as various controls described in the present embodiment can be executed, the multifunctional peripheral 101 of the present embodiment may have any configuration, and may be a printing apparatus capable of color printing or a printing apparatus capable of monochrome printing.

The scanning device 409 reads a document image and performs image processing on the read image data. The interface 408 transmits and receives image data and the like to and from a facsimile machine, a network connected device, or an external dedicated device. The HDD 404 stores image data of a plurality of jobs to be printed, accepted from one of the scanning device 409 and the interface 408. Therefore, the multifunctional peripheral 101 according to the present embodiment can print, by the print device 410 via the HDD 404, job data accepted from the scanning device 409 (copying function). Further, the multifunctional peripheral 101 can print, by the print device 410 via the HDD 404, job data accepted from an external apparatus via the interface 408 (print function). The multifunctional peripheral 101 according to the present invention is an MFP-type printing apparatus having a plurality of functions (also referred to as an image forming apparatus).

The HDD 404 also stores, for example, various types of management information that are permanently stored, changed, and managed by the multifunctional peripheral 101 according to the present invention. The print device 410 executes a process for printing, on a print medium, data of a job to be printed, which is stored in the HDD 404. The operation device 413 is a display unit corresponding to an example of a user interface.

The CPU 401 collectively controls processes, operations, and the like of various units included in the multifunctional peripheral 101. The ROM 403 stores various control programs required by the present embodiment, including programs for executing various processing of flowcharts to be described later. The ROM 403 also stores display control programs for displaying various UI screens on the display unit of the operation device 413, including user interface screens (hereinafter referred to as UI screens) that are illustrated.

The CPU 401 causes the multifunctional peripheral 101 to execute various operations described in the present embodiment by reading and executing programs of the ROM 403. The ROM 403 is a read-only memory in which programs such as a boot sequence and font information, and various programs such as the above-mentioned programs are stored in advance. In addition, the ROM 403 stores a file server function program for exposing the file system provided by the multifunctional peripheral 101 and making it accessible to client apparatuses. The ROM 403 also stores a web program and the like for providing functionality based on a web page via a web server provided in the multifunctional peripheral 101 that is accessed using a web browser. The ROM 403 also stores an in-device hot folder program that provides the in-device hot folder function to a client apparatus via a web access function. The various programs stored in the ROM 403 will be described later in detail.

The RAM 402 is a memory that can be read from and written to, and stores image data, various programs, and setting information transmitted from the scanning device 409 or the interface 408. The HDD 404 is a large-capacity storage apparatus that stores image data compressed by the compression/expansion circuit 406, raster image data acquired by the RIP circuit 405 expanding print data, and the like. The HDD 404 holds a plurality of pieces of data such as print data of jobs to be processed. The CPU 401 controls data of a job to be processed, which is input via various input units such as the scanning device 409 and the interface 408, so that the data of the job can be printed by the print device 410 via the HDD 404. The CPU 401 also controls to enable transmission to an external apparatus via the interface 408. In this manner, the CPU 401 performs control so as to be able to execute various types of outputting processing on data of jobs to be processed that are stored in the HDD 404. Further, the CPU 401 is configured to be able to, for a file system constructed inside the HDD 404, realize functionality of performing file sharing or transmission/reception with respect to an external apparatus, by reading out and executing programs from the ROM 403.

The RIP circuit 405 includes a RIP (Raster Image Processor) circuit for converting received print data into raster image data. The compression/expansion circuit 406 performs compression and decompression operations on image data or the like that is stored in the RAM 402 or the HDD 404 by various compression methods such as JBIG or JPEG. With the above-described configuration, the CPU 401 as an example of a control unit included in the present printing system also controls the operation of the sheet-processing device 412.

The NIC 407 is a Network Interface Card that is connected to the LAN and is for inputting and outputting image data and apparatus information. The interface 408 is, for example, a serial bus interface for USB, a LAN, or the like, and is connected to the scanning device 409 and the print device 410. The scanning device 409 is a scanner that includes an auto document feeder. Light is irradiated onto a bundle of document images or a document image of one sheet by a light source (not shown), and an original reflected image is formed on a solid-state imaging device such as a CCD (Charge Coupled Device) sensor by a lens. Then, a raster image reading signal is acquired as image data from the solid-state imaging device. The image data is transferred via the interface 408, and stored in the HDD 404.

The print device 410 is a part for forming an image onto a sheet, and a typical operation principle is as follows. A light beam such as a laser beam modulated in accordance with image data is caused to be incident on a rotating polygonal mirror (a polygonal mirror), and irradiated onto a photosensitive drum as reflected scanning light through a reflecting mirror. A latent image formed on the photosensitive drum by the laser beam is developed by toner, and the toner image is transferred to the sheet material, in other words the medium, adhered to the transfer drum. A full-color image is formed by sequentially executing this series of image forming processes with respect to yellow (Y), magenta (M), cyan (c), and black (K) toners. Configuration may be taken such that, in addition to the four colors, a toner referred to as a special color, a transparent toner, or the like can be transferred. The sheet material on the transfer drum onto which the full-color image is formed is then conveyed to a fixing device. The fixing device is composed of a combination of a roller and a belt, and incorporates a heat source such as a halogen heater, and, by heat and pressure, melts and fixes the toner onto the sheet material onto which the toner image was transferred.

The sheet feeding device 411 is a device including a cassette or a tray for storing media such as paper or OHP sheets that are used for printing, and feeds stored media to the print device 410. The sheet-processing device 412 is an apparatus for acquiring a product acquired by performing various processes on a medium after image formation by the print device 410. The various types of processing include stapling processing in which the ends of a bundle of media conveyed to the sheet-processing device 412 are closed with staples, and the like. Also included is a bookbinding process in which a center portion of a bundle of media similarly conveyed to the sheet-processing device 412 is bound by staples and folded along the staples. In addition, a stapleless binding process or the like is included in which the end of a bundle of media conveyed to the sheet-processing device 412 is closed by applying pressure with a tooth pattern. Further, punching processing for performing a punch pressing process at an end of a medium conveyed to the sheet-processing device 412 is included.

The operation device 413 provides various interfaces for when an operator performs various settings and operations of the multifunctional peripheral 101 according to the present invention.

Next, referring to FIG. 4B, the configuration of the software (programs) of the multifunctional peripheral 101 will be described. These programs are stored in the ROM 403, read out by the CPU 401 of the multifunctional peripheral 101, and executed.

A boot loader 601 is a program that is executed immediately after the power of the multifunctional peripheral 101 is turned on. These programs include programs for executing various startup sequences necessary for startup of the system. An operating system 602 is a program whose purpose is to provide an execution environment for various programs for realizing the functions of the multifunctional peripheral 101. This mainly provides the functions of managing the memories of the multifunctional peripheral 101, namely resources such as the ROM 403, the RAM 402, and the HDD 404, and basic input/output control of the other components shown in FIGS. 4A and 4B.

A network control program 603 is a program that is executed when data is transmitted to or received from a device connected via a network. This program is used at the time of execution of various processes such as reception processing of a file to be printed, transmission of data from an external apparatus, transmission and reception of commands, and the like. The network control program 603 also includes a driver program for controlling the NIC 407.

A file system server 604 is a server program for providing an external apparatus connected via a network with the ability to make requests for file creation, transmission, reception and the like, with respect to files in the HDD 404 of the multifunctional peripheral 101. By the program being activated and operating, an external apparatus such as the PCs 102 and 103 and the mobile terminal 104 which are connected to the network can, via the network, use files in the HDD 404 and services provided by the file system.

A web server 605 is a program for providing a server function in which a web service provided in accordance with web content and a web program comprised by the multifunctional peripheral 101 can be used by an external apparatus such as the PCs 102 and 103 and the mobile terminal 104 which are connected via the network. A hot folder function program 606 is a characteristic program that is provided by the multifunctional peripheral 101 according to the present invention. Specifically, this program, by the web server 605, detects reception of a request for a web service from a client apparatus connected to the network. Further, the program executes a series of functions provided as the in-device hot folder function in response to the detected reception of the request.

A JDF function program 607 is a program for executing a JDF print function executed by the CPU 401 in response to an instruction from the NIC 407 when JDF job data is received. In the JDF print function, the CPU 401 sequentially instructs the operation of respective devices described by FIGS. 4A and 4B in an appropriate order based on a processing order and a processing condition written in this program. These devices include the sheet-processing device 412, the print device 410, the HDD 404, the compression/expansion circuit 406, the RAM 402, and the like. The program also includes a process for analyzing JDF job data received via the NIC 407, a process of determining, as a result of the analysis process, whether or not a setting that is incorrect for JDF is included, and program processing for performing, for example, a setting change for resolving an incorrect setting.

A PDL print function program 608 executes a PDL print function which is executed by the CPU 401 when PDL data (print job data) is received. In the PDL print function which is performed by the CPU 401, the CPU 401 sequentially instructs the operation of respective devices described by FIGS. 4A and 4B in an appropriate order based on a processing order and a processing condition written in this program. These devices include the sheet-processing device 412, the print device 410, the HDD 404, the compression/expansion circuit 406, the RAM 402, and the like.

A media management program 609 is a program for executing a management function related to sheets that can be used by the multifunctional peripheral 101. Sheet-related information managed by the program is stored in the HDD 404. A user authentication program 610, based on usage rights setting information of a user who uses the multifunctional peripheral 101, executes control for limitation and permission/prohibition of usage of the multifunctional peripheral 101 and the functions that it provides. The user authentication program 610 firstly executes an authentication process, and based on the result of the authentication process, executes the above-described function usage permission/prohibition, processing for controlling usage, and the like. The authentication process can be performed via the operation device 413 provided in the multifunctional peripheral 101, or via web screens provided through a Web browser on the PCs 102 and 103, the mobile terminal 104, or the like.

A print job queue management program 611 is a program responsible for job generation through print processing, post-printing processing, generation of job management information that includes confirmation of a job status in the course thereof, and the like. Specifically, the above-described JDF function program 607, PDL print function program 608, hot folder function program 606, and the like each receive a print request, generate a print job, and manage the life cycle of processing for executing the generated print job. These programs also includes a process of managing execution order in accordance with an order of job execution requests with respect to a region of the HDD 404 or the like temporarily, in order to sequentially process job data generated in the multifunctional peripheral 101. Other programs 612 is a generic name for programs that are not included in any of the above-described programs that are stored in the ROM 403 and can be executed by the multifunctional peripheral 101. Since these are not important for explaining the effect of the present invention, explanation thereof is omitted.

<Client Apparatus Hardware Configuration>

Figure 5A:
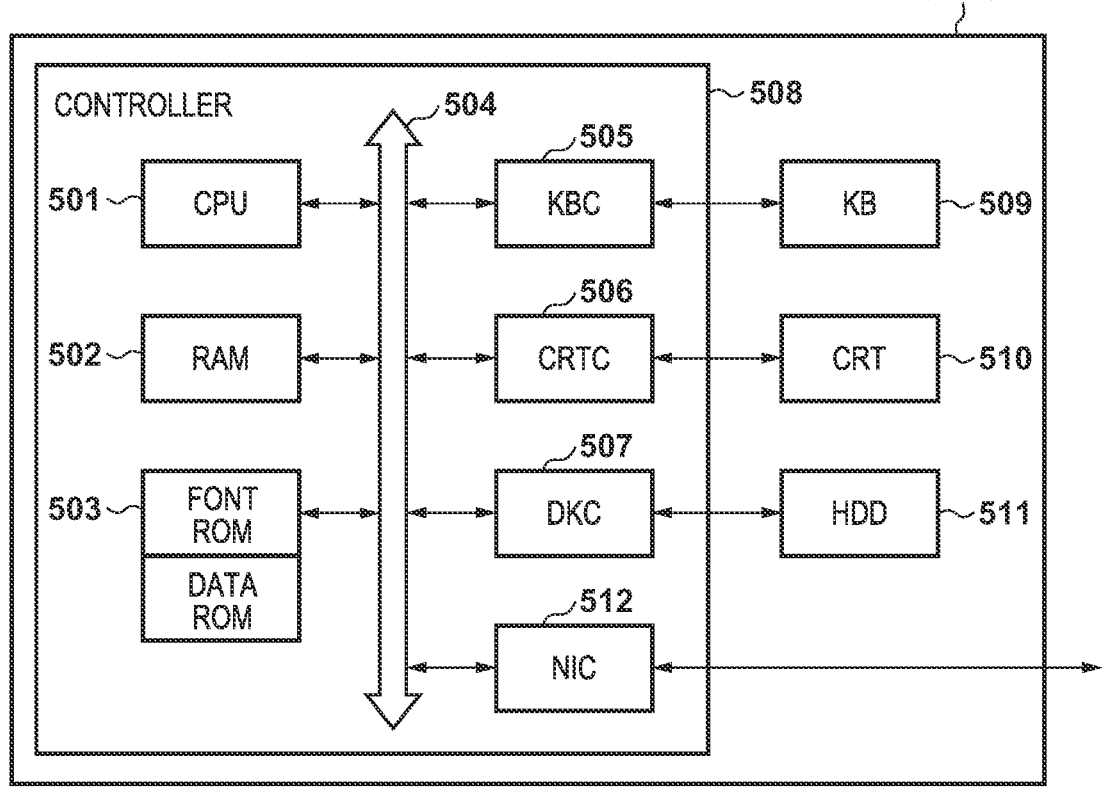
FIGS. 5A and 5B are block diagrams for explaining a configuration of a client apparatus.
Figure 5B:
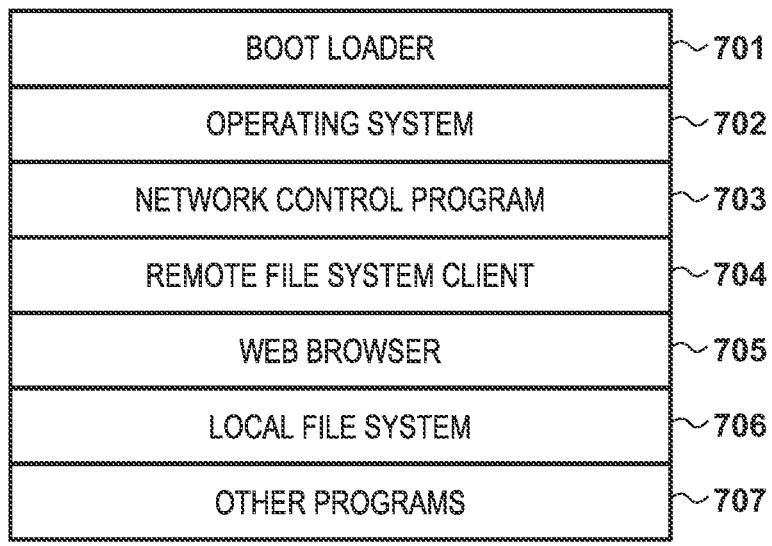

Next, referring to FIGS. 5A and 5B, a configuration of a client apparatus, that is the PCs 102 and 103 and the mobile terminal 104 in FIG. 1, will be described. FIG. 5A shows a hardware configuration of the client apparatus, and FIG. 5B shows a software configuration of the client apparatus. The client apparatus includes a controller 508, a keyboard (KB) 509, a display unit (CRT) 510, and a HDD 511. The controller 508 includes a CPU 501, a RAM 502, a ROM 503, a keyboard controller 505, a display controller (CRTC) 506, a disk controller 507, and a NIC 512. These components are connected through a bus 504 so that they can transmit signals to each other.

The CPU 501 executes a program stored in a program ROM of the ROM 503, and an OS or general application program loaded from the HDD 511 to the RAM 502. The ROM 503 also has a font ROM and a data ROM. The RAM 502 functions as a main memory, a work area, and the like of the CPU 501. The keyboard controller (KBC) 505 controls input from a keyboard or a pointing device (not shown). The display controller (CRTC) 506 controls display with respect to the display unit (CRT) 510. The disk controller (DKC) 507 controls accesses to the HDD 511 which stores boot programs, various applications, font data, and the like. The network controller (NIC) 512 is connected to a network and executes communication control processing with respect to another device connected to the network. The bus 504 is connected to the CPU 501, the RAM 502, the ROM 503, various controllers, and the like, and conveys data signals and control signals.

In the case of a mobile terminal, a touch panel controller or the like may be included in the configuration instead of the keyboard controller (KBC) 505. In addition, a large-capacity storage apparatus may be provided instead of the HDD 511. Further, the network controller (NIC) 512 has an internal configuration that differs between the cases where the apparatus includes a wired LAN, includes a wireless LAN, or includes both. However, the differences due to these internal configurations are concealed inside the network controller (NIC) 512, and the system can be controlled as equivalent to the other modules shown in the same figure.

Next, referring to FIG. 5B, the configuration of software (programs) held by the PCs 102 and 103 and the mobile terminal 104, which are client apparatus, will be described.

A boot loader 701 indicates programs that are executed immediately after the power of the PCs 102 and 103 and the mobile terminal 104 is turned on. These programs includes programs for executing various startup sequences necessary for startup of the system. An operating system 702 is a program whose purpose is to provide an execution environment for various programs for realizing the functions of the PCs 102 and 103 and the mobile terminal 104. This provides functions such as for resource management of the memories of the PCs 102 and 103 and the mobile terminal 104, that is, the ROM 503, the RAM 502, the HDD 511, and the like.

A network control program 703 is a program that is executed when data is transmitted to and received from a device connected via a network. This program can be used when a file system executes transmission of a file to be printed. A remote file system client 704 and the web browser 705, which will be described later, are used subordinately when the functions provided by the file system server 604 and the web server 605 held by the multifunctional peripheral 101 connected via the network are used.

The remote file system client 704 is a program that operates on the client apparatus side when executing processing for transmitting or receiving a file to or from an external device, such as the multifunctional peripheral 101 connected via the network, using the network control program 703. This program is for executing processing on the client when accessing a function of a file server provided by an external device connected via a network, to use the function of the file server. The remote file system client 704 accesses a file server provided by an external device connected to the network via the network controller (NIC) 512, and enables file transmission, reception, copying, and the like.

The web browser 705 is a client program for a case of using a web service that is provided by an external apparatus and is operated by the web server 605, where the external apparatus is an external device connected via the network. The web browser 705 may be provided in advance in the apparatus as a part of the functions of the operating system, in the case of a general-purpose operating system. On the other hand, since a web browser is also an application program that operates on a general-purpose client apparatus, it is also conceivable that a user of the client apparatus could install and use any web browser application. In the present embodiment, the form in which the web browser 705 is provided on the client apparatus is not relevant.

A local file system 706 is a file management function program that executes file management such as creation, editing, deletion, and the like of various files stored in the HDD 511. In combination with the remote file system client 704 described above, the local file system 706 accesses the file system server 604 of an external apparatus connected via the network, and copies a file managed by the file system 706 to the external apparatus which is a remote apparatus. A network file management function such as the reverse of above: copying a file on the remote apparatus side to the local file system 706, is realized.

Other programs 707 includes a group of programs that do not correspond to any of the above, but detailed description thereof is omitted. Note that there may be a form in which various programs such as the above-described local file system 706, remote file system client 704, network control program 703, and web browser 705 are provided as a part of the operating system 702. Irrespective of whether or not the operating system 702 includes the various functions described above as its own functions, the present invention applies as long as the client apparatus has these functions.

Correspondence among the software/hardware configurations provided by the respective systems of the client apparatus (102, 103, 104), and the multifunctional peripheral 101 shown in FIGS. 3 to 5B and described above, is as described below. The operation unit 327 is realized by the CPU 501 executing the web browser 705 together with control of input/output devices such as the KB 509, the CRT 510, the CRTC, and the KBC 505. The web server unit 328 is realized by the CPU 401 executing the web server 605. The file system unit 329 is realized by the CPU 401 executing the file system server 604 and the network control program 603.

The printer unit 314 is realized by the CPU 401 executing the JDF function program 607 and the CPU 401 controlling various print devices, in other words the print device 410, the compression/expansion circuit 406, and the sheet-processing device 412. The media management unit 315 is a functional unit that controls a sheet in a manner suitable for an image forming process performed by the printer unit 314. The media management unit 315 is realized by the CPU 401 executing the media management program 609 and controlling the sheet feeding device 411 and the sheet-processing device 412.

The hot folder function unit 321 is realized by the CPU 401 executing the hot folder function program 606. The job execution unit 316 is realized by the CPU 401 executing the JDF function program 607. The print queue management unit 319 and the job registering unit 320 are realized by the CPU 401 executing the print job queue management program 611.

<Description of Web Browser Screen for Login>

Next, with reference to FIGS. 6A and 6B, description will be given for an initial screen that is displayed on a web browser screen as a result of a web request transmitted to the multifunctional peripheral 101 when the web server 605 uses the hot folder function program 606.

When the PCs 102 and 103 and the mobile terminal 104 access the hot folder function program 606 included in the multifunctional peripheral 101 via the web browser 705, an authentication request screen shown in FIG. 6A is first displayed on the web browser screen. This screen displays a user name field 801 for a user name which is information necessary for authentication, a password input field 802 for a password corresponding to the user name, an authentication server selection field 803 for a login destination, and a login button 804.

When the user of the hot folder function program has appropriately inputted user information, as shown in FIG. 6B, into the respective fields provided by these screen and then presses the login button 804, the authentication process is executed by the user authentication program 610. The authentication information required for the authentication process of the user authentication program 610 is transmitted from the web browser 705 to the user authentication program 610 via the web server 605 of the multifunctional peripheral 101 through the network.

<Description of Web Browser Screen for Folder Display>

Next, referring to FIGS. 7A-7E, description is given of examples of the in-device hot folder function screen displayed on the web browser screen when authentication is successful.

FIG. 7A shows the initial status of the web browser screen of the hot folder function. Screen components displayed on the web browser screen will be described with reference to the same figure. However, description of screen components typically provided by the web browser function itself, such as an address display field of the web browser screen and the title tabs of respective web pages, which are not related to the hot folder function according to the present embodiment, will be omitted.

A folder display area 901 is a hierarchy management function area which is managed by the file system server 604 included in the multifunctional peripheral 101 via the web browser screen of the web browser 705, and enables an operation such as movement or display of a hierarchy on the file system, and creation of a new folder. A print function selection button 902 is a button used when a print function is selected from among various functions provided by the hot folder function. A screen for default functions that is displayed immediately after passing through the authentication process shown in FIGS. 6A and 6B is the screen shown in FIG. 7A.

A job list display button 903 is a button for transitioning to a screen for displaying a list of print jobs that have been inputted to the multifunctional peripheral 101 via the hot folder function. A current path display area 904 is an area for displaying a process target, that is, a current path in an absolute path format from a root folder in a case where the file system server 604 of the multifunctional peripheral 101 is accessed by the web browser 705. In FIG. 7A, that the current path is "/share" is illustrated. This is a state in which the state of the highest hierarchy of a public folder managed by the file system server 604 of the multifunctional peripheral 101 in the present embodiment is displayed on the web browser screen. It is not possible to move to a higher hierarchy than "/share" which is the highest hierarchy of publically available folders, and the file system server 604 of the multifunctional peripheral 101 in this embodiment does not allow a user to create a folder just below the folder of the highest hierarchy. FIG. 7A shows an example of a screen that satisfies this behavior.

A folder button 905, which is a destination folder designation button, is a button corresponding to a folder under the present folder. A number of destination folder designation buttons corresponding to the number of folders in the hierarchy of the current folder are displayed, each button has the name of the respective folder, and when selected, a folder screen request process is performed, and there is a transition to the screen of the folder indicated by the name. That is, the folder button 905 is a button for transitioning to a screen for "/share/folder". The folder screen request process will be described with reference to FIGS. 13 and 14.

A logged-in user display area 906 is an area for displaying the user name inputted at the time of authentication using the web browser screen shown in FIGS. 6A and 6B. A user-specific function selection button 907 is a button for instructing a transition to various function providing screens customized for each login user.

A folder type display area 908 is a characteristic screen area in the present invention, and is an area for providing information to enable a determination as to whether or not a folder on the file system server 604 indicated by the path displayed in the current path display area 904 is a hot folder. In the example of the screen illustrated in FIG. 7A, it is illustrated that the folder on the file system server 604 corresponding to the current path "/share" is not a hot folder. In this state, even if an operation for performing a file transmission process to be described later is performed, transmission of a file is not performed.

FIG. 7B shows an example of a screen state that is transitioned to immediately after the folder button 905 which is a destination folder designation button is selected in the screen state shown in FIG. 7A. This is a screen in which there is a transition from "/share" shown in FIG. 7A to "folder" which is immediately below, and "/share/folder" is displayed in the current path display area 904. The file system server 604 of the multifunctional peripheral 101 in the present embodiment is configured so that the user can create any folder or file in a folder lower than the uppermost folder. Therefore, unlike FIG. 7A which shows the highest hierarchy, a folder generation button 909 and an upper hierarchical movement button 910 are displayed.

The folder generation button 909 is a button for creating a new folder in the present folder. The upper hierarchical movement button 910 is a button for transitioning from the current folder to a higher folder. When the upper hierarchical movement button 910 is selected, a folder screen request process for the folder of one level higher is performed. A print setting generation button 911 is a button for transitioning to a screen for arranging a print setting file in the present folder. The print setting creation screen which is the destination of this transition will be described with reference to FIGS. 8A-8F.

FIG. 7C shows an example of a state of a screen of the web browser that is displayed immediately after the folder generation button 909 is selected in FIG. 7B. A folder name input field 912 is an input field for inputting a name of a folder to be created. When an OK button 914 is pressed in a state where a text string of a desired folder name has been inputted, a folder having the same name as that described above is created immediately below the current path. When a cancel button 913 is pressed, the folder creation process is not executed, and the screen state returns to that of FIG. 7B which is the source of the transition. The OK button 914 can be selected when text has been input in the folder name input field 912. If the inputted folder name is the same as the name of an already existing folder, no folder is created.

Figure 7D:
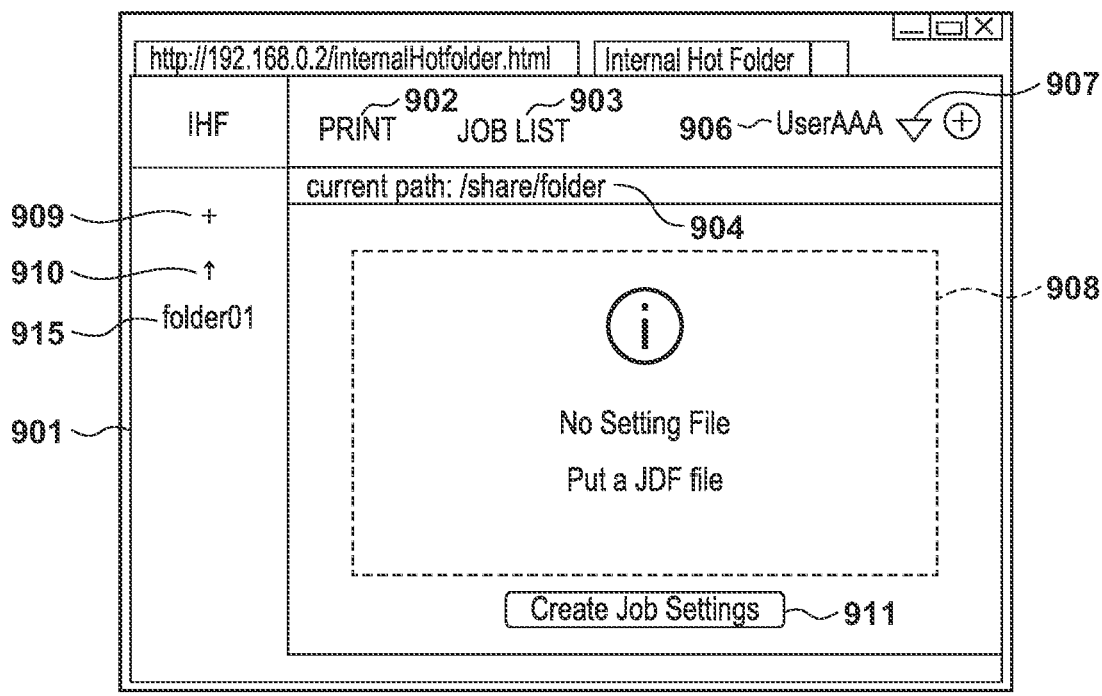

FIG. 7D shows an example of a state of a screen of the web browser that is displayed immediately after the OK button 914 is selected in FIG. 7C. As shown graphically, it can be confirmed by the addition of a folder01 button 915 to the folder display area that a folder named "folder01", which is the name of the folder created and indicated on the screen of FIG. 7C, has been newly created.

Figure 7E:
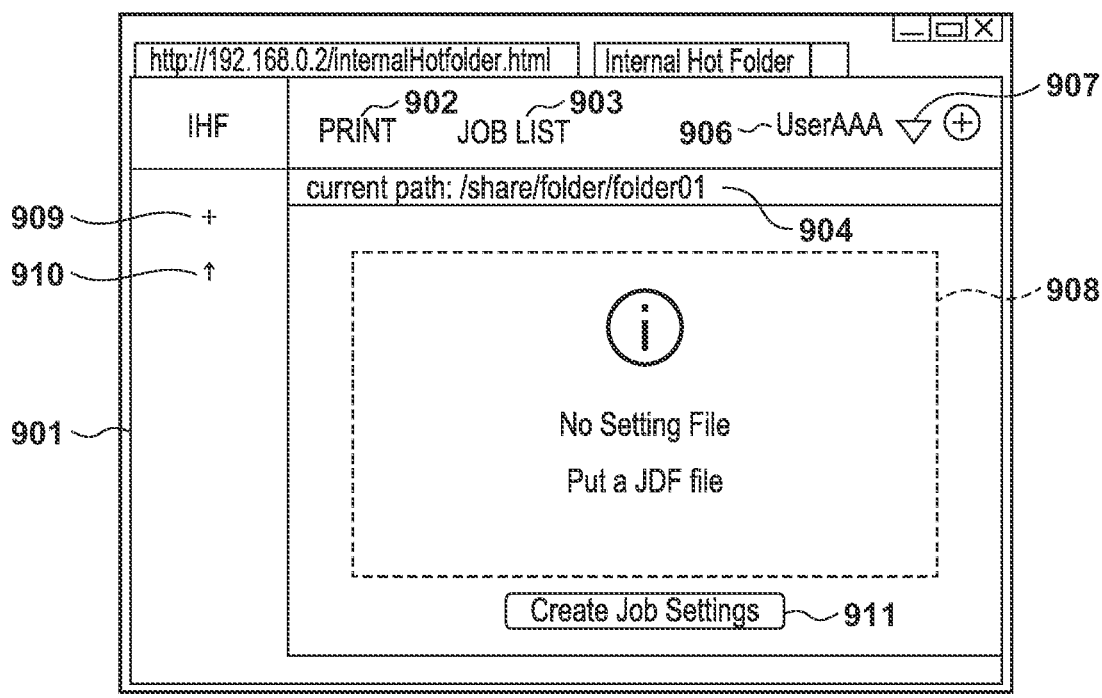

FIG. 7E shows an example of a state of a screen of the web browser that is displayed immediately after the folder01 button 915 is selected, when the screen displayed on the web browser is in the state shown in FIG. 7D. As shown in the figure, the current path display area 904 is "/share/folder/folder01". That is, it is confirmed that the current path has moved to the folder created by operating the screen components related to folder creation that were presented on the screens of FIGS. 7C and 7D.

<Description of Web Browser Screen for Creating Print Settings>

Figure 8A:
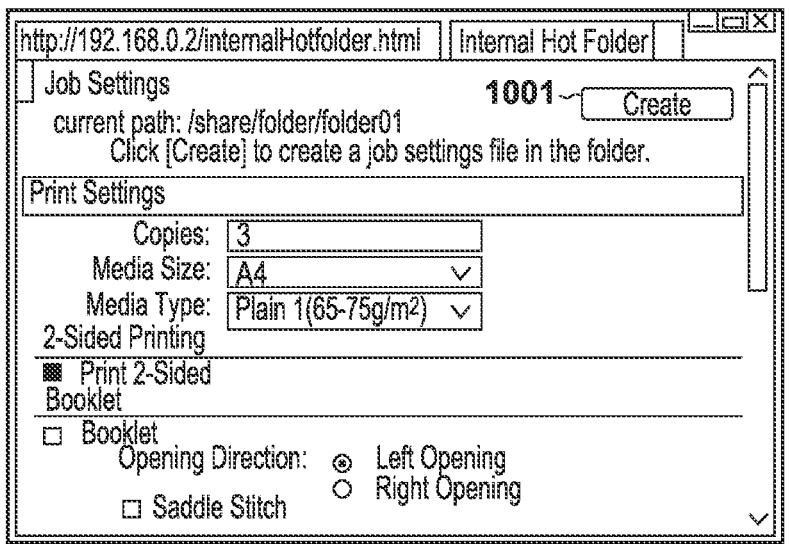
Figure 8B:
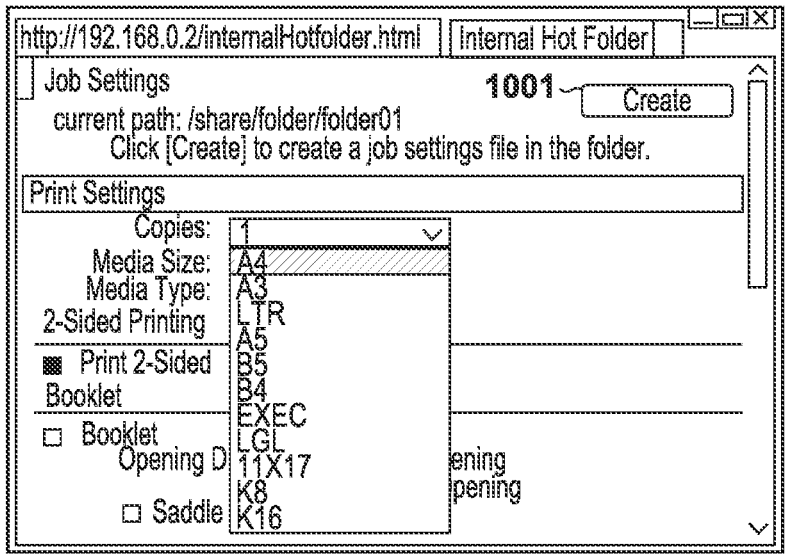
Figure 8C:
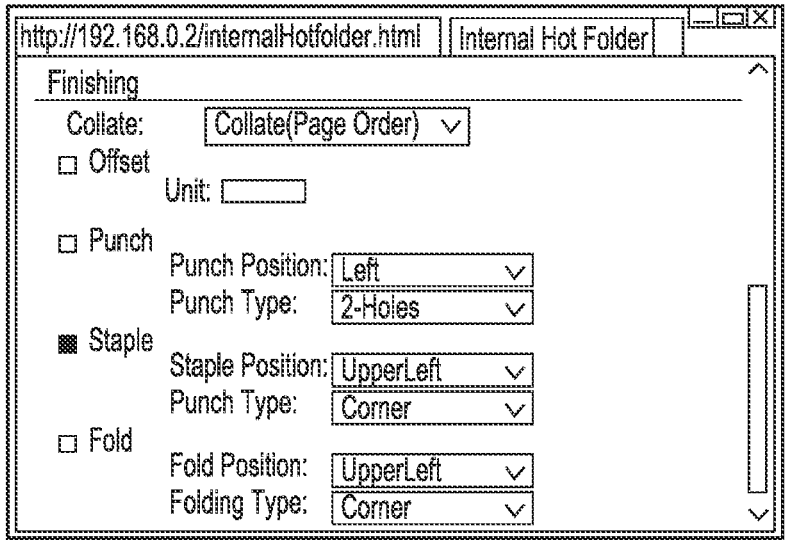

Next, referring to FIGS. 8A to 8F, a web browser screen for print setting creation according to the present embodiment will be described. FIGS. 8A-8C are a print setting creation screen that is transitioned to by selecting the print setting generation button 911 in FIG. 7E. Function selection buttons, select boxes, and the like for selecting print settings that can be designated as the hot folder function of the multifunctional peripheral 101 are arranged. Each of FIGS. 8A-8C displays a part of the screen in a scroll-displayed state because the display area of the web browser screen is limited. However, the present invention is not limited to this screen configuration, and it may be displayed as a single screen by, for example, changing the displayed window size or changing the displayed character size. Because these are typical screen controls in a web browser, detailed description thereof will be omitted. The print settings that can be set on the print setting creation screen include designating a print setting, designating a number of copies and what paper is to be used, designating an output destination for the paper, designating a resolution, designating color or monochrome, making a designation relating to image processing at the time of printing such as a profile, and designating post-processing for printed sheets such as staples and punch folds.

FIG. 8D shows an example where a folder for which print settings have been created on the print setting creation screens of FIGS. 8A, 8B, and 8C is displayed. In the folder type display area 908, information indicating that the folder is a "hot folder" in which the print function can be used is presented. In this state, a file transmission process can be performed by dragging and dropping a file held in one of the PCs 102 and 103 and the mobile terminal 104 to the folder type display area 908.

As described above, the current path "/share/folder/folder01" has been changed to a hot folder, and new function selection buttons (1002, 1003) are arranged on the screen of the web browser. A print setting confirmation button 1002 is for confirming print settings created for the folder. A temporary setting button 1003 is for making an instruction to transition to a function selection screen provided for the purpose of temporarily changing a print setting created for the folder and applying the settings in order to improve convenience when executing a print job.

FIG. 8E shows an example of an error-information presentation screen. This screen is a screen for notifying an error that can occur when a folder movement operation is performed with respect the hot folder function program 606 via the web server 605 using functionality of the Web browser and folder movement provided by the web browser screen. Error information indicating that the designated folder does not exist, and information indicating that a normal folder operation as described above cannot be performed because of the error are presented in the folder type display area 908. The above-described error state is a case in which, when a first user is browsing a folder of a certain hierarchy on the web browser screen, another user deletes the same folder or changes the folder name, and the first user accesses the folder in this state. In this case, since the folder of the designated name does not already exist, it is possible to present screen information indicating an error as shown in the figure and notify the user accordingly. A similar error state also occurs when a user directly designates an address on a screen to display a file path that does not exist in the browser.

FIG. 8F is an example of print setting creation request data transmitted to the web server 605 when the print setting generation button 911 is selected. In the present embodiment, description is given for a case where print setting information is written in an XML format, but the print setting information may be in any format as long as the content of the print setting items set in FIGS. 8A, 8B, and 8C can be stored. When print settings are designated by the series of print setting creation screens shown in FIGS. 8A, 8B, and 8C, and a generation button 1001 is selected, the designated print settings are converted into XML-format data shown in FIG. 8F by JavaScript (registered trademark) code or the like. XML data 1005 comprises a plurality of parts, including an XML declaration portion 1006, a metadata portion 1007, a general print setting portion 1008, and a layout setting portion 1009, respectively.

The XML declaration portion 1006 is a statement that must always be written to indicate that the data format is XML. The metadata portion 1007 is for stating information on a target folder, and in the illustrated example, address information or path information of a folder to which print settings are applied is written in a folder path portion 1004. The general print setting portion 1008 states, for example, information on sheets used in printing, a number of copies, and a discharge method. The layout setting portion 1009 states a printing surface or an order of printing surfaces, a number of surfaces, and the like. The content of the general print setting portion 1008 is increased or decreased in accordance with designated print settings. For example, when a stapling setting or a folding setting is designated, information corresponding to a stapling setting portion and a folding setting portion is added. The generated XML data 1005 is transmitted to the web server 605 by asynchronous communication by the aforementioned web browser program. The web server 605 transmits the received XML data to the hot folder function program 606, and the hot folder function program 606 analyzes the data and creates a JDF file for realizing the print designation included in the XML data.

<File System Configuration of Multifunctional Peripheral>

Figure 9A:
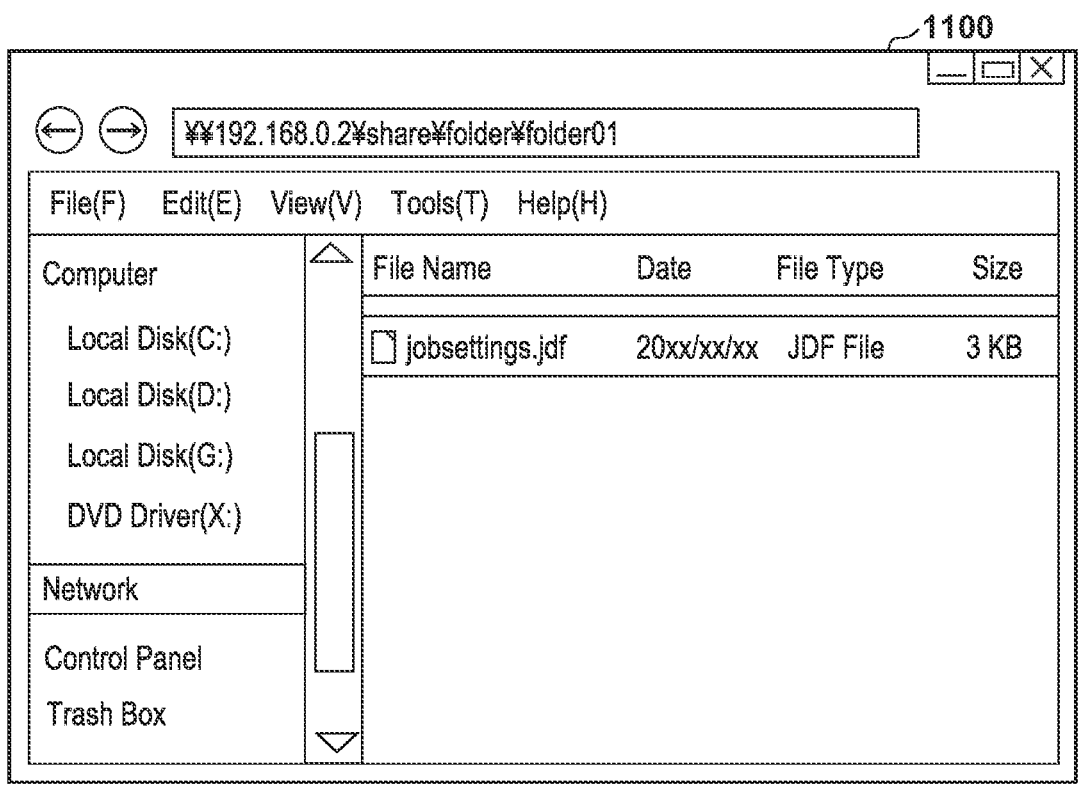
Figure 9C:
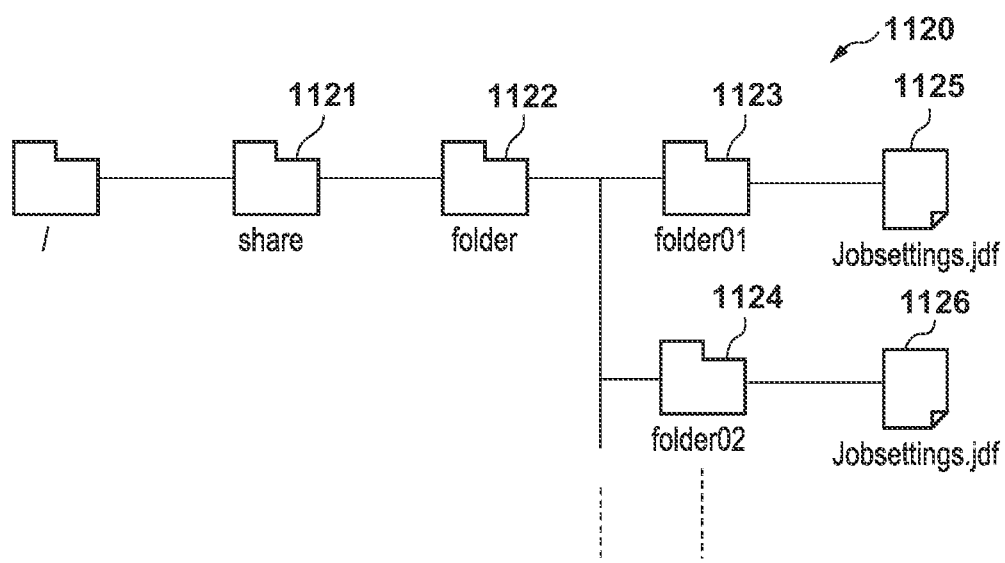

Next, referring to FIG. 9A to FIG. 9C, the configuration of the file system of the multifunctional peripheral 101 according to the present embodiment will be described. FIG. 9A is a client file system screen 1100 in which a folder configuration created on the HDD 404 of the multifunctional peripheral 101 is displayed on the CRT 510 of the client apparatus 102 via the file system server 604. In the folders where a print setting file is created from the print setting creation screen of FIGS. 8A-8F, it is possible to confirm that a JDF file is created as the print setting file.

FIG. 9B is an example of a JDF file. FIG. 9C is a schematic diagram showing a folder configuration in the HDD 404 of the multifunctional peripheral 101. This has a state where folder01 (reference numeral 1123) and folder02 (reference numeral 1124) have been created by the operation of FIGS. 7A-7E, and respective print setting files 1125 and 1126 have been created by the operation of FIGS. 8A-8F. A share folder 1121 is a folder of the highest hierarchy, and a folder 1122 is at a hierarchy one below.

Description of Web Browser Screen for Application Settings>

Figure 10:
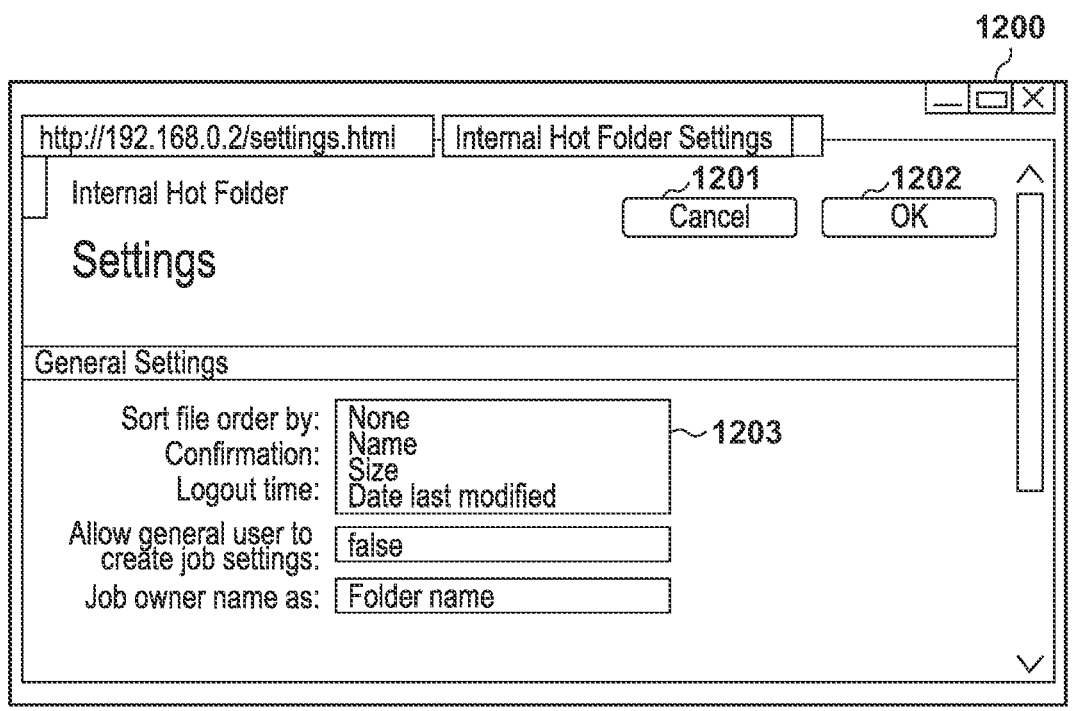
FIG. 10 is a view showing an example of a web page that has a function of setting an in-device hot folder and is to be displayed on the web browser 705.

Next, referring to FIG. 10, an application setting screen 1200 for setting operation of a program according to the present embodiment will be described. The screen can be acquired from the multifunctional peripheral 101 by the use of a browser from a client to access a predetermined address. There are many setting items in the application setting screen 1200, but only those items related to a file transmission order will be described here.

A cancel button 1201 is a button for ending the application setting screen 1200. When the cancel button 1201 is selected, application settings performed in the application setting screen 1200 are not saved. The web browser screen transmits a display request for the folder screen of a transition source to the web server 605, and the screen transitions according to a response.

An OK button 1202 is a button for ending the application setting screen 1200. When the OK button 1202 is selected, the web browser transmits a request for saving application settings made on the application setting screen 1200 to the web server 605. The request for saving application settings includes at least items and setting values for application settings that have been changed. Upon receipt the request for saving application settings, the web server 605 stores them in the RAM 402 and HDD 404 in association with user identity information acquired from the request.

A file transmission order selection menu 1203 is a selection menu for designating an order for transmitting files when a print request for a plurality of files is received. As described above, the web server 605 prints files in the order in which they are received. The file transmission order selection menu 1203 includes items for selecting not to change the order, a filename order, a file size order, and a last update date/time order. If "Do not change order" is selected, the order of the files is not changed, so that the order may change depending on the type or version of the client system. That is, the order will depend on the system of the client. By selecting any one of file name order, file size order, and last update date/time order, printing can be performed in an order into which the files are sorted according to a certain rule without depending on the system. An initial selection state when the screen is opened is a setting value for that time, and an item indicating this setting that is stored in the RAM 402 in association with the user information.

<Examples of File Sorting Program>

Next, referring to FIGS. 11A-11E, description will be given for JavaScript as an example of a program for determining the order of transmitting files. Programs running on web browsers need not be JavaScript. FIG. 11A is a name order sorting program 1300 showing examples of JavaScript for acquiring a transmission order when files are transmitted in name order. FIG. 11B shows a last update date/time order sorting program 1310, which is an example of JavaScript for acquiring transmission order when files are transmitted in last update date/time order. FIG. 11C is a file size order sorting program 1320 showing examples of JavaScript for acquiring transmission order when files are transmitted in file size order. FIGS. 11D and 11E are an order arrangement generation sub-program 1330 and a sub-program for determining array addition completion 1340, respectively, and are subprograms called from the programs shown in FIGS. 11A, 11B, and 11C.

As described above, according to the setting of the file transmission order selection menu 1203, the JavaScript to be transmitted is determined and transmitted to the client apparatus together with the job input screen of FIG. 8D. The transmitted JavaScript operates on the web browser when an instruction to print a plurality of files is accepted, determines the transmission order of the files, and transmits the print files to the web server 605 in that order.

<Description of Web Browser Screen for When a Print Job is Inputted>

Next, referring to FIGS. 12A-12E, description is given for examples of screens that are transitioned to immediately after files are arranged by an operation such as dragging and dropping into the folder type display area 908 of FIG. 8D using an instructing apparatus such as a mouse. As stated in the description for FIG. 7E, the folder in which the current path is "/share/folder/folder01" is a hot folder, and is not simply a shared folder. This is a folder to which print settings have been linked by the series of operations shown in FIGS. 8A-8C. Therefore, when the above-described operation is performed with respect to this folder via a web browser, a processing request and processing to transmit the print target data from the web browser 705 to the web server 605 are executed. This processing is performed by the web browser 705 executing JavaScript, as stated in the description of the hot folder function program 606 in FIG. 4B.

Figure 12A:
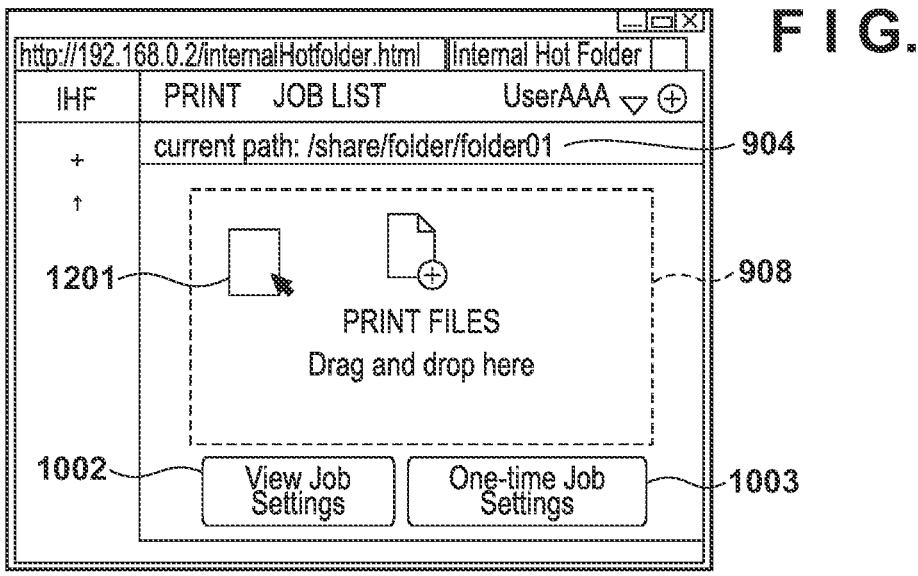
FIGS. 12A-12E are diagrams of the transition of web pages displayed on the web browser 705 when a print instruction is made.

FIG. 12A shows a screen displayed by the web browser 705 when an operation of dragging and dropping a file to the folder type display area 908 is performed using an instructing apparatus such as a mouse. A drag-and-drop display 1401 indicates that a drag-and-drop operation is in progress. This display is provided by the system of the client apparatus and is not necessarily as shown in the figure. No matter how display is performed, there is no impact on the practice of the present invention.

Figure 12B:
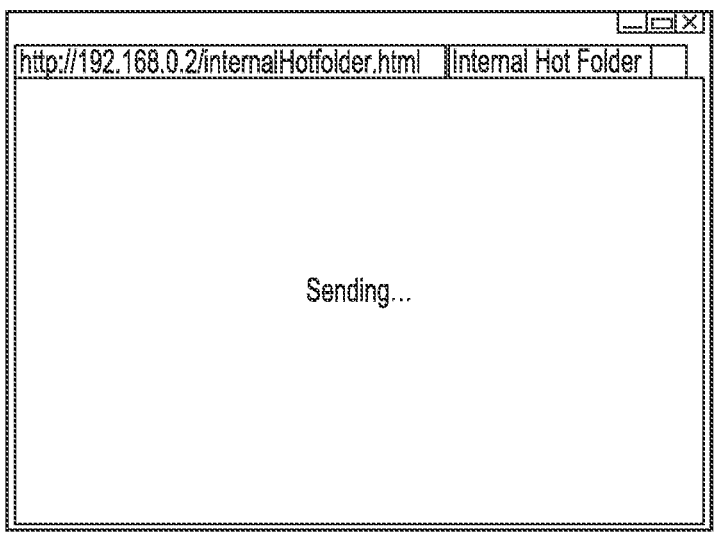
Figure 12C:
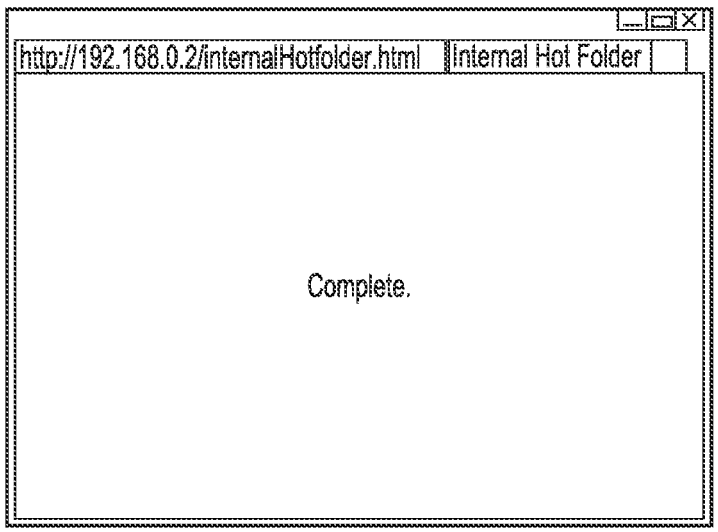
Figure 12D:
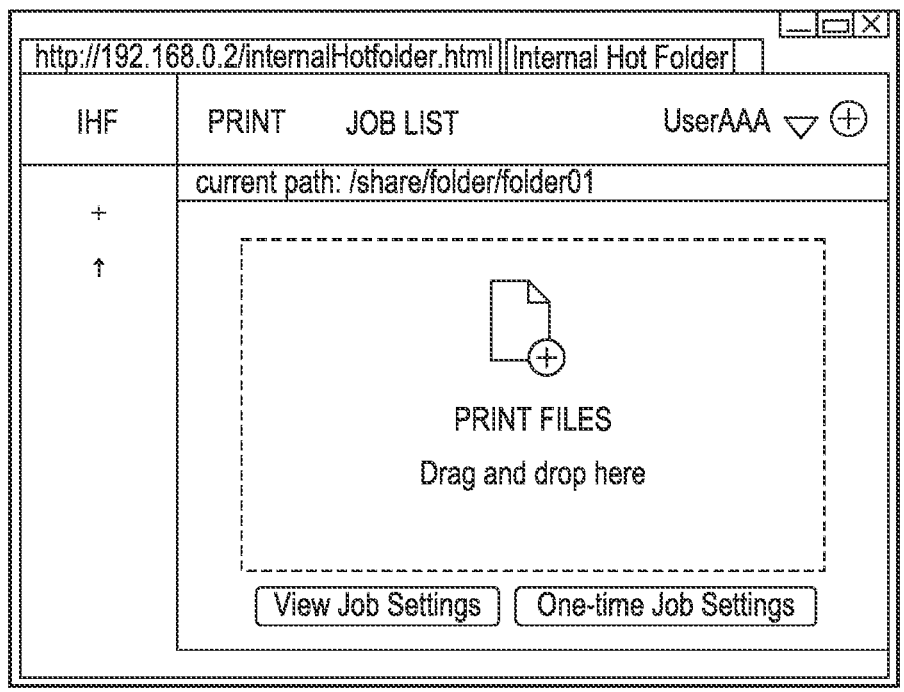

FIG. 12B shows an example of a screen displayed by the web browser 705 during transmission of a file. As shown in the figure, information that enables the file transmission being underway to be determined is presented. When a plurality of files are transmitted at the same time, display to enable the number of files being transmitted to be identified is performed. For example, each time a file being transmitted changes, the display is changed. FIG. 12C illustrates an example of information displayed on the web browser screen immediately after the processing performed by the web browser 705 in FIG. 12B, that is, immediately after the transmission processing of the print target file is completed. As shown in the figure, information that enables completion of the file transmission process to be determined is presented. FIG. 12D shows an example of a screen transitioned to after a predetermined amount of time has elapsed after the screen displayed by the web browser 705 entered the state shown in FIG. 12C. The screen state shown in the figure is the same as that shown in FIG. 7E. That is, information indicating that the instruction of print processing with respect to the current path "/share/folder/folder01" can be accepted again is presented.

Figure 12E:
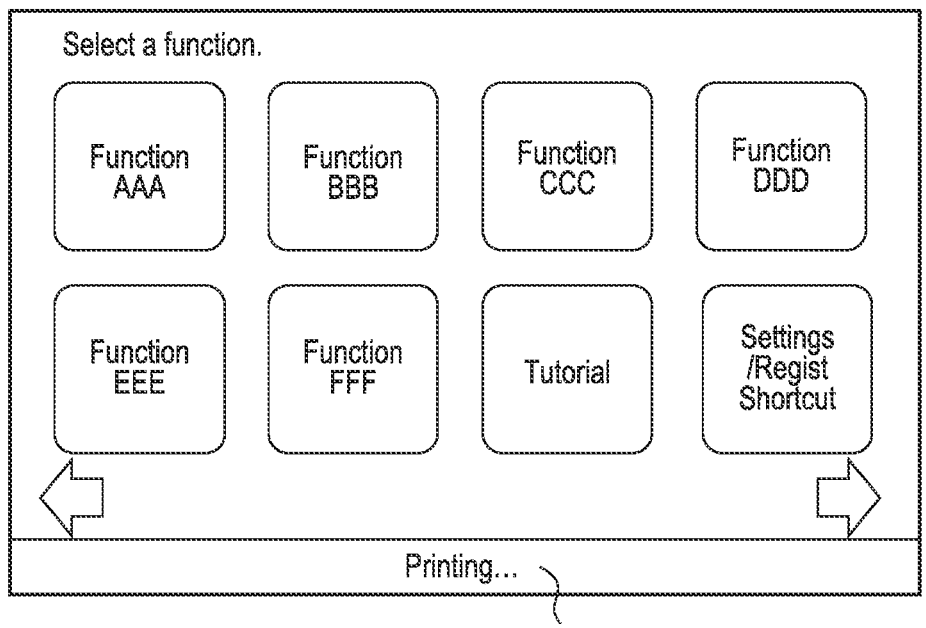

FIG. 12E is an example of a screen displayed on the operation device 413 of the multifunctional peripheral 101 when a transmitted file is being printed. The print order of the transmitted files will be described later with reference to the chart of FIG. 15 and the schematic diagrams of the print lists of FIGS. 19A-19D. A device status display 1402 is an area for displaying the present state of the multifunctional peripheral 101. In FIG. 12E, "Printing" is displayed because the multifunctional peripheral 101 is executing print processing. When there is no state to be displayed, nothing is displayed, and when an error such as a jam or consumable exhaustion occurs, the details of the error that has occurred are displayed.

As stated by the description of FIG. 12B, immediately after print target files from a client apparatus are arranged by an operation such as dragging and dropping or the like, a web browser program in accordance with JavaScript is executed for this operation. This JavaScript includes, from among the JavaScript described by FIGS. 11A-11E, something corresponding to the setting selected in the file transmission order selection menu 1203. In accordance with the file sorting program, when a print instruction operation is performed simultaneously for a plurality of files, the files are rearranged in accordance with the setting of the file transmission order selection menu 1203, and the rearranged files are transmitted to the multifunctional peripheral 101.

<Processing Sequence When Accepting Operation on Web Browser>

Figure 13:
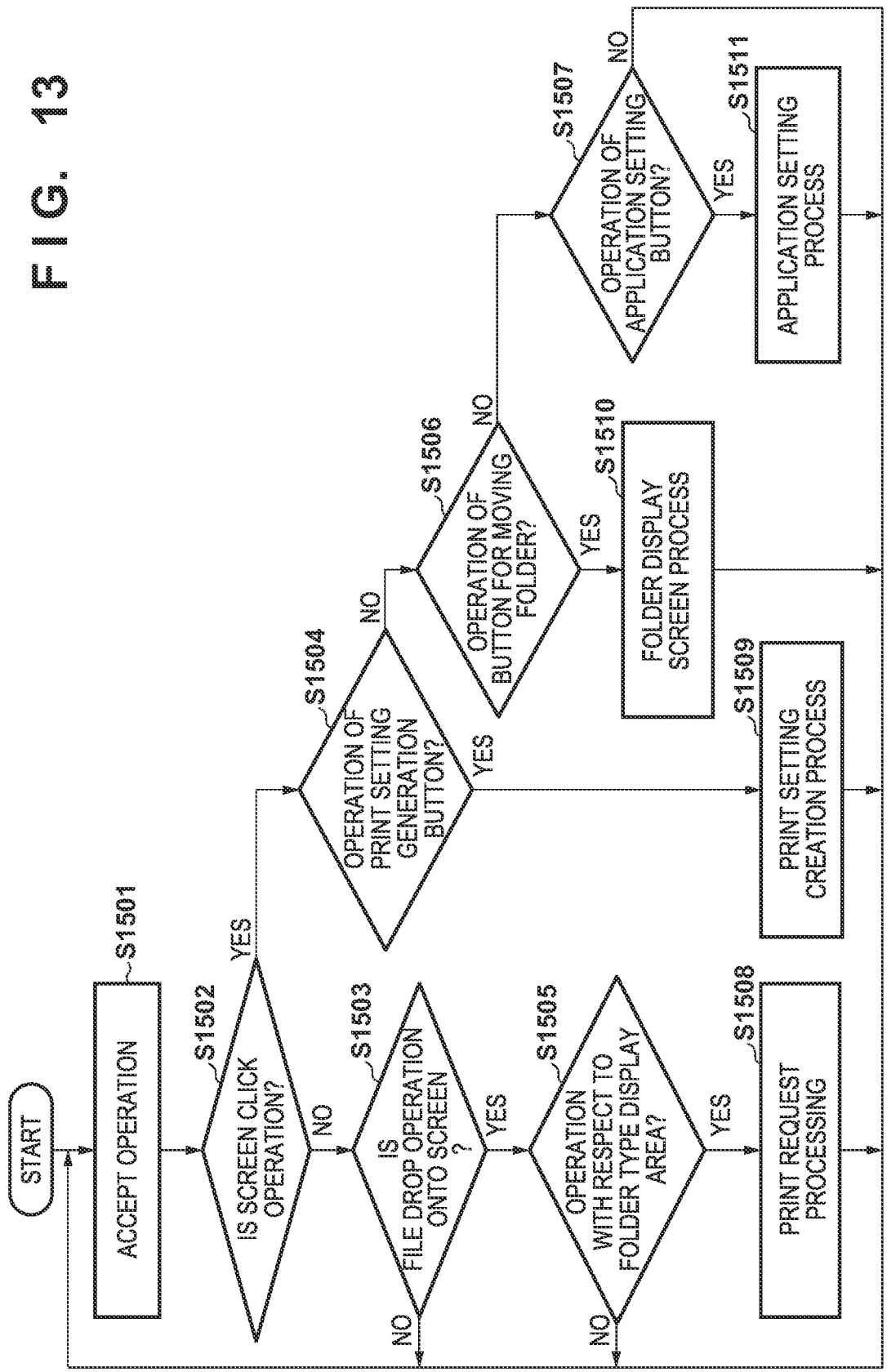
FIG. 13 is a flow chart showing a sequence of processing by a CPU 501 when an operation is accepted by a web browser.

Next, referring to FIG. 13, a sequence of processing by the CPU 501 when executing the functions described in FIGS. 7A-12E will be described. The processing described below may be realized by, for example, the CPU 501 of the client apparatus reading out a control program stored in the ROM 503 or the HDD 511 to the RAM 502 and executing the control program. Here, the processing is started from the point where an operation screen is displayed on the web browser 705 in accordance with the operation described with reference to FIGS. 6A, 6B, and 7A-7E.

In step S1501, the CPU 501 accepts an operation from a user with respect to the web browser 705. If it is determined that an operation has been accepted, the processing proceeds to step S1502, otherwise, the processing remains in step S1501. In step S1502, the CPU 501 determines whether or not the operation accepted in step S1501 is an operation of clicking the client apparatus screen. In a case of an operation where the screen is clicked, the processing proceeds to step S1504; otherwise, the processing proceeds to step S1503. The operation of clicking the screen here corresponds to a click operation by a pointing device such as mouse in the case of the PCs 102 and 103, and corresponds to a touch operation of a touch panel device in the case of the mobile terminal 104. With respect to a click operation, when a press is released within a predetermined time after the start of the press, it is determined that this operation has been performed.

In step S1503, the CPU 501 determines whether or not the operation accepted in step S1501 is an operation of dragging and dropping files onto the screen. If the operation is an operation for dragging and dropping, the processing proceeds to step S1505; otherwise, the processing proceeds to step S1501. With respect to a drag-and-drop operation, for example, it is determined that the operation is performed in a case of after the detection of a press of a mouse button, and, after a predetermined amount of time has elapsed and movement of a predetermined distance, the release of the press is detected. In step S1505, the CPU 501 determines whether or not the operation in step S1501 of dragging and dropping files is an operation with respect to the folder type display area 908. If so, the processing proceeds to step S1508; otherwise, the processing proceeds to step S1501.

Meanwhile, in step S1504, the CPU 501 determines whether or not the operation of clicking the screen accepted in step S1501 is an operation with respect to the print setting generation button 911. With respect to a click operation, for example, when the release of a press is detected within a predetermined time after the button of the mouse is pressed, it is determined that this operation is performed. In the case of an operation where the print setting generation button 911 is clicked, the processing proceeds to step S1509; otherwise, the processing proceeds to step S1506. In step S1506, the CPU 501 determines whether the operation of clicking the screen accepted in step S1501 is an operation on a button for moving a folder, that is, an operation on the upper hierarchical movement button 910 or the destination folder designation buttons 905 or 915. In a case of an operation where the destination folder designation button is clicked, the processing proceeds to step S1510, otherwise, the processing proceeds to step S1507. In step S1507, the CPU 501 determines whether or not the operation of clicking the screen accepted in step S1501 is an operation of clicking an application setting button. If so, the processing proceeds to step S1511; otherwise, the processing proceeds to step S1501.

In step S1508, the CPU 501 executes the file sorting program to determine the transmission order of the files to be transmitted, and executes the file transmitting program to execute a communication process for transmitting to the web server 605. One file is transmitted in one transmission. The time required for the transmission process in this step depends on the size of print target data, the communication speed of the network 100, and the processing speed of JavaScript executed by the CPU 501 of the client apparatus (102, 103, 104). The web server 605 transitions to a reception standby state for the result of the data-transmission process executed in step S1508. The execution processing of the web server 605 remains in the same step until a response from the web server 605 is received. With the completion of the processing of transmitting the print target data and the reception by the web browser 705 of the response from the web server 605, a screen in accordance with the received response is displayed. When the screen is displayed, the processing proceeds to step S1501.

In step S1509, the CPU 501 displays a print setting creation screen on the web browser 705 and executes a print setting creation process for accepting input. This process is described above with reference to FIGS. 8A-8F. When this process is finished, the processing proceeds to step S1501. In addition, in step S1510, the CPU 501 acquires a folder screen from the multifunctional peripheral 101, and executes a folder screen request process for displaying the acquired web page. The folder screen request process is a process of transmitting a path of a folder to be acquired by using a GET request or the like which is a standard function of a web browser, and displaying the acquired folder screen on the web browser 705. Once this is displayed, the processing proceed to step S1501. In step S1511, the CPU 501 executes an application setting process. The application setting processing is described above with reference to FIG. 10. When the application setting process ends, the processing proceeds to step 1501.

<Processing Sequence for When Request to Display Folder Screen is Accepted>

Figure 14:
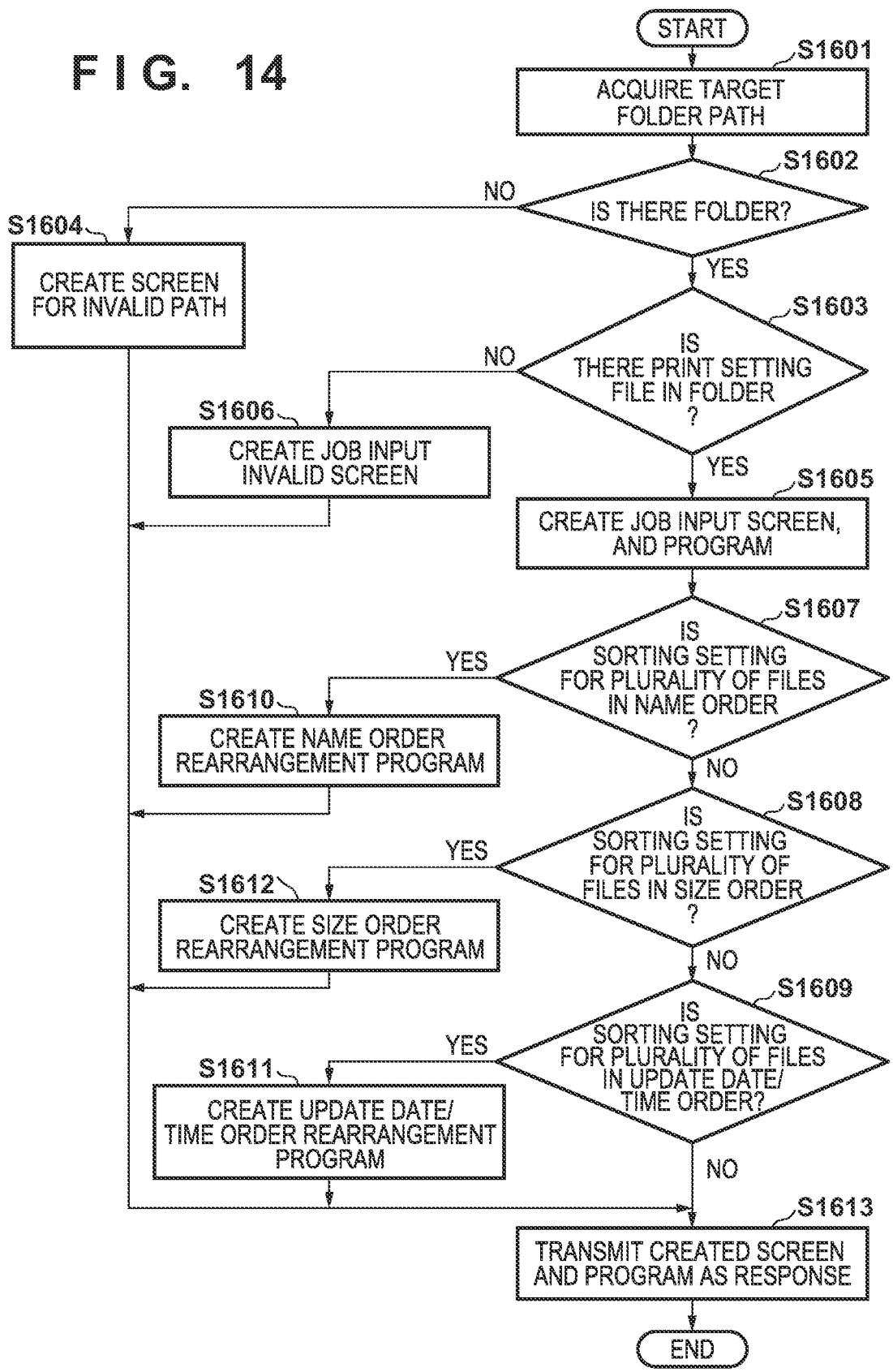
FIG. 14 is a flow chart showing a sequence of processing by a CPU 401 when a folder screen request is received.

Next, referring to FIG. 14, description is made for a sequence of processing by the CPU 401 of the multifunctional peripheral 101 when a request for displaying a folder screen according to the present embodiment is accepted. The processing described below may be realized by, for example, the CPU 401 of the multifunctional peripheral 101 reading out a control program stored in the ROM 403 or the HDD 404 to the RAM 402 and executing the control program. Processing is started when a request to display a folder screen is accepted from a client.

In step S1601, the CPU 401 functions as an accepting unit, and acquires a path of a folder to be displayed from the accepted folder screen display request. In the present embodiment, it is assumed that a folder screen display request is made by the GET method of HTML communication, and the path of the folder is designated by a GET parameter. When the path of the folder is acquired, the processing proceeds to step S1602.

In step S1602, the CPU 401 determines whether or not a folder exists at the folder path acquired in step S1601. If a folder exists, the processing proceeds to step S1603, and if a folder does not exist, the processing proceeds to step S1604. In step S1604, the CPU 401 creates the web page shown in FIG. 8E, which is a folder screen indicating that the folder path is invalid, and the processing proceeds to step S1613.

Meanwhile, in step S1603, the CPU 401 determines whether or not there is a print setting file in the folder indicated by the folder path acquired in step S1601. Whether or not there is a print setting file is determined by acquiring a list of files in the folder and determining whether or not there is a file having a predetermined file extension. If a print setting file is present, the processing proceeds to step S1605, otherwise the processing proceeds to step S1606. It is assumed that, if the folder itself is not present, there is no print setting file. In step S1606, the CPU 401 creates the web page of FIG. 7D, which is a folder screen in which the designated print request is invalid, and the processing proceeds to step S1613.

In step S1605, the CPU 401 creates the web page of FIG. 8D, which is a designated folder screen with respect to which a print request is possible, and a program that operates on a Web browser, and the processing proceeds to step S1607. Here, it is assumed that some of the print request process is performed by JavaScript. Subsequently, in step S1607, the CPU 401 determines whether or not the sorting setting (a print setting) for when a plurality of files are inputted is designated as name order. The sorting setting at the time of inserting a plurality of files is described above with reference to FIG. 10. When the sorting setting at the time of inserting a plurality of files is designated as name order, the processing proceeds to step S1610, and when this is not designated, the processing proceeds to step S1608. In step S1610, the CPU 401 selects a program for transmitting files in order of name, adds it to the program created in step S1605, and proceeds to step S1613. As described above, in the present embodiment, JavaScript is used. For the program, something created in advance may be selected and used.

Meanwhile, in step S1608, the CPU 401 determines whether or not the sorting setting at the time of inserting a plurality of files is designated as file size order. When the sorting setting at the time of inserting a plurality of files is designated as file size order, the processing proceeds to step S1612, and when this is not designated, the processing proceeds to step S1609. In step S1612, the CPU 401 selects a program for transmitting files in size order, adds it to the program created in step S1605, and proceeds to step 1613.

In step S1609, the CPU 401 determines whether or not the sorting setting at the time of inserting a plurality of files is designated as update date/time order. When the sorting setting at the time of inserting a plurality of files is designated as update date/time order, the processing proceeds to step S1611, and when this is not designated, the processing proceeds to step S1613. In step S1611, the CPU 401 selects a program for transmitting files in update date/time order, adds it to the program created in step S1605, and proceeds to step S1613.

In step S1613, the CPU 401 transmits the web page, the file transmitting program, the file sorting program, or the like created in steps S1604, S1606, S1605, S1610, S1611, or S1612 as a response, and ends the process.

<Process for Receiving Print Request>

Figure 15:
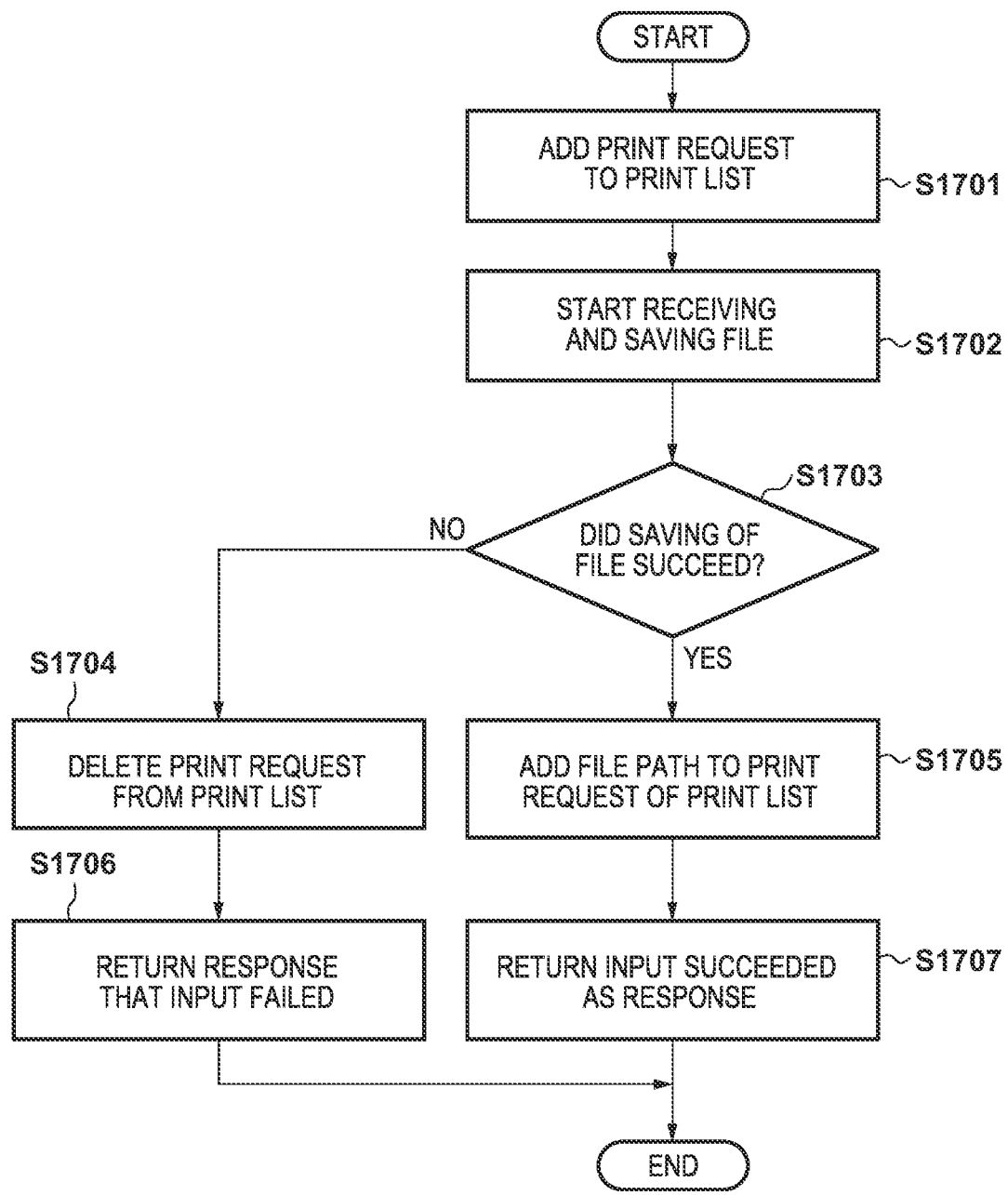
FIG. 15 is a flow chart showing a sequence of processing by a CPU 401 when a print request is accepted.

Next, referring to FIG. 15, description is given for a sequence of processing of the CPU 401 process of the multifunctional peripheral 101 when a print request transmitted by the client apparatus 102, 103, and 104 is received in the above step S1508. The processing described below may be realized by, for example, the CPU 401 of the multifunctional peripheral 101 reading out a control program stored in the ROM 403 or the HDD 404 to the RAM 402, and executing the control program. When a print request from the client apparatus 102, 103, 104 is detected, the processing is started.

In step S1701, the CPU 401 adds the print request to the end of a print list stored in the RAM 402 and the processing proceeds to step S1702. The information to be added includes the path of a hot folder that is the input destination and is included in the received request, the name of who inputted the request, a file name, and the like. In step S1702, the CPU 401 reads a body portion of the request and saves the file in a storage unit such as the HDD 404. Once the file is saved, the processing proceeds to step S1703.

In step S1703, the CPU 401 determines whether or not the saving of the file succeeded. It fails in a case where the network is disconnected while the files is being received, a case where a storage area of the HDD 404 is insufficient and saving cannot be performed, and the like. If the file is successfully saved, the processing proceeds to step S1705; otherwise, the processing proceeds to step S1704.

In step S1704, the CPU 401 deletes the print request added in step S1701 from the print list. Subsequently, in step S1706, the CPU 401 creates and returns a response indicating that input of the file has failed. The response may include, for example, a web page for displaying a screen indicating that the file input has failed. When the response is returned, the network is disconnected, and the processing ends. Note that, if the network has been disconnected, the processing ends without the return of a response.

Meanwhile, in step S1705, the CPU 401 adds the file path (storage destination) to which saving was performed in step S1702 to the print request added in step S1701. Subsequently, in step S1707, the CPU 401 creates and returns a response indicating that the input of the file has been successful. The response may include a web page or the like for displaying a screen indicating that the file has been successfully input. When the response is returned, the network is disconnected and the processing ends. Note that, if the network has been disconnected, the processing ends without the return of a response.

<Sequence of Processing for Case of Processing Print Request of Print List>

Next, referring to FIG. 16, a sequence of processing for sequentially printing print requests of a print list stored in the RAM 402 will be described. The processing described below may be realized by, for example, the CPU 401 of the multifunctional peripheral 101 reading out a control program stored in the ROM 403 or the HDD 404 to the RAM 402, and executing the control program. The CPU 401 performs the processing of the print request shown in FIG. 16 in parallel with the processing for the time of receiving the print request shown in FIG. 15. When it is detected that the print list stored in the RAM 402 is changed, the processing is started.

In step S1801, the CPU 401 determines whether or not the path of a file is stored in the first print request of the print list. If not even one print request is stored in the print list or the path of a file is not stored in the first print request, the processing is terminated.

In step S1802, the CPU 401 retrieves the print request for which print processing has been performed, that is, the first print request, from the print list, and deletes this print request from the print list. After deletion, the processing proceeds to step S1803. Subsequently, in step S1803, the CPU 401 performs print processing of the print request retrieved in step S1802. This processing will be described later with reference to FIG. 17. When the print processing of the print request has been performed, the processing proceeds to step S1801.

<Sequence of Processing for Print Processing of Print Request>

Next, referring to FIG. 17, a sequence of processing by the CPU 401 in the processing of the print request of step S1803 of the present embodiment will be described. The processing described below may be realized by, for example, the CPU 401 of the multifunctional peripheral 101 reading out a control program stored in the ROM 403 or the HDD 404 to the RAM 402, and executing the control program. This processing starts when the CPU 401 determines in the above step S1801 that the path of the file in the first print request of the print list is stored.

In step S1901, the CPU 401 determines whether or not there is a print setting file in the destination folder which is stored in the first print request of the print list. Here, it is assumed that the print setting file is a JDF file, and it is determined whether or not a file is a JDF file in accordance with the file extension. If there is a JDF file, the processing proceeds to step S1902; if there is no JDF file, the processing proceeds to step S1907. When the folder itself is not present, it is determined that there is no JDF file.

In step S1902, the CPU 401 analyzes the JDF file. In this processing, syntax analysis and semantic analysis of the JDF file are performed, and values necessary for print settings are acquired. The print settings acquired here are the print settings designated by the creation screens described by FIGS. 8A-8F. Subsequently, in step S1903, the CPU 401 determines whether there is an error in a result of the analysis of the JDF file in step S1902. An error occurs in a case where syntax is incorrect, a case where a print setting includes a designation for which execution is impossible, and the like. When an error is detected, the processing proceeds to step S1907, and when there is no error, the processing proceeds to step S1904.

In step S1904, the CPU 401 acquires the file path stored in the first print request of the print list, and prints the file. The print settings acquired in the JDF analysis processing of step S1902 are used to print the file. Next, in step S1905, the CPU 401 determines whether or not printing of the file which was performed in step S1904 succeeded. Printing fails in a case where a print file does not exist, a case where printing is canceled part way through, or the like. If it is determined that printing succeeded, the processing proceeds to step S1906; otherwise, the processing proceeds to step S1907.

In step S1906, the CPU 401 stores the print request as printing complete at the end of the print history stored in the RAM 402, and ends the processing. Meanwhile, in step S1907, the CPU 401 stores the print request as printing failure at the end of the print history stored in the RAM 402, and ends the processing.

<Operation and Transmission Order When Performing Print Request for Plurality of Files>

Next, referring to FIGS. 18A and 18B, description will be given for an operation of dragging and dropping files that is performed by the user 326 onto the folder type display area 908, and a print order when the present invention is used.

Figure 18A:
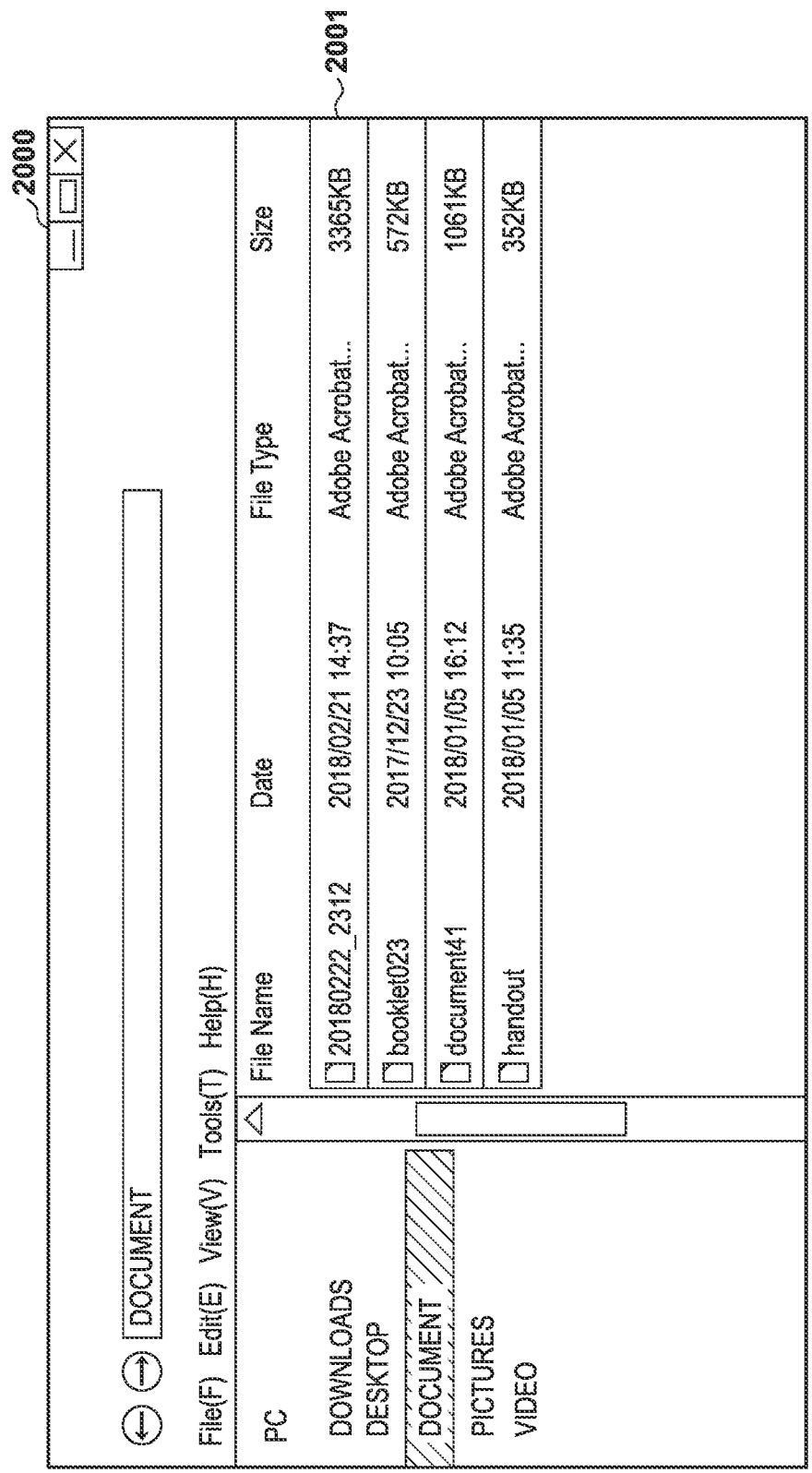

FIG. 18A shows a file system screen 2000 of a client at a time of selecting a plurality of files, indicating an operation of the user 326 dragging and dropping files which is to be performed onto the folder type display area 908. The screen displayed by the web browser 705 at the time of a drop operation after the selection is described above with reference to FIG. 12A. Selected state files 2001 are files selected on the file system of the client. In the selected state files 2001 shown in FIG. 18A, there is a state in which four files are simultaneously selected. By performing an operation of selecting a plurality of files simultaneously using a mouse or a keyboard of a user interface, it is possible to have them enter the selected state simultaneously. In this state, a user can simultaneously request printing of the plurality of files by performing a drag-and-drop operation onto the folder type display area 908 of the folder screen using the mouse.

FIG. 18B shows the transmission order of the files determined by the file sorting program when a print instruction is requested in accordance with the operation described with reference to FIG. 18A. An unsorted transmission order 2011 is a file transmission order for when not sorting is set. The transmission order for a case of not sorting is determined by the client apparatus file system and is not necessarily the same as in the example given here. For example, in Windows, the transmission order differs depending on a position when a plurality of files are dragged. The unsorted transmission order 2011 is for when the position of "booklet023.pdf" is dragged and dropped onto the folder type display area 908. When "document41.pdf" is dragged, the order becomes "document41.pdf" then "handout.pdf" then "20180222_2312.pdf" and then "booklet023.pdf". A file name order transmission order 2012 is the file transmission order for when file name order is set. Rearrangement is performed in ascending order for a case of representing file names by UTF-8.

A file size order transmission order 2013 is a file transmission order for when the file size order is set. Rearrangement is performed so that transmission is performed in order from the smallest file size. A last update date/time order transmission order 2014 is a file transmission order for when last update date/time is set. Rearrangement is performed so that transmission is performed from the oldest update date/time. As described above, there is a problem that the order changes depending on the system of the client apparatus and the order also changes depending on the operation, and, in accordance with the present invention, it is possible to print in a determined order at all times.

<Change of Print List>

Figure 16:
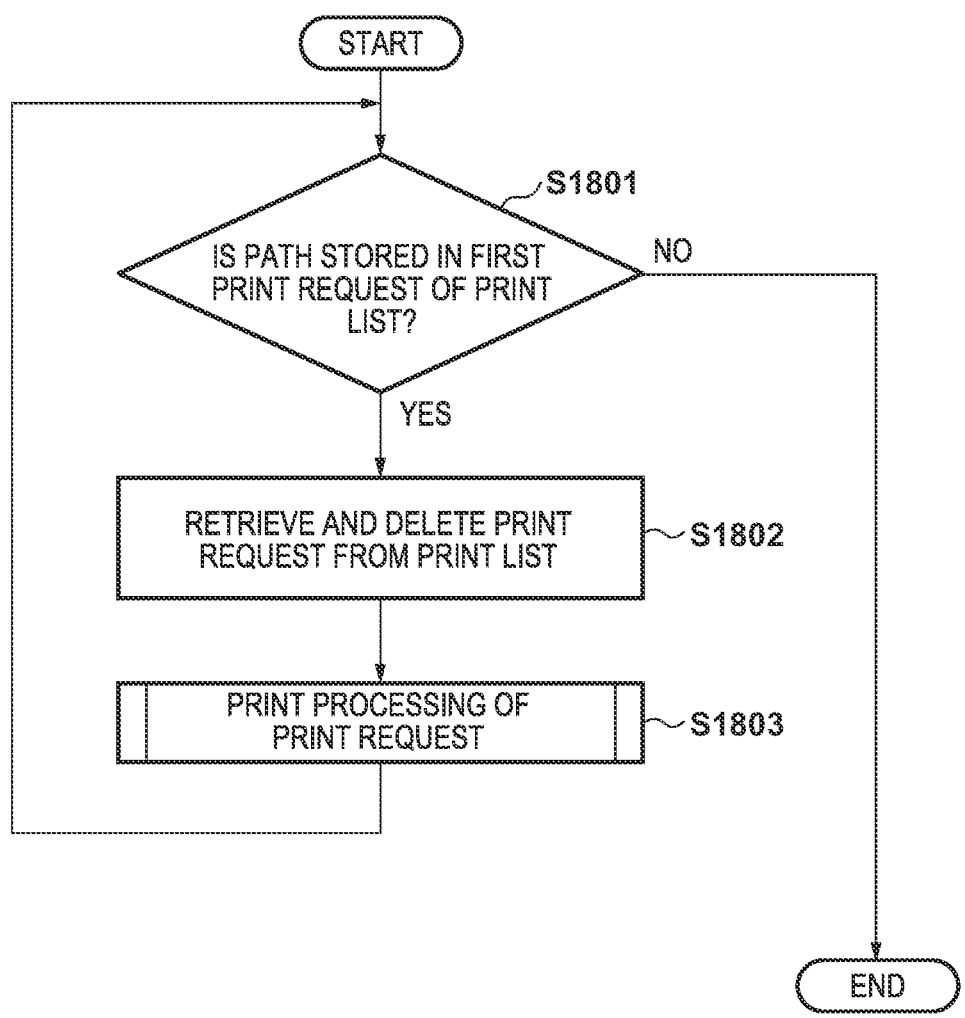
FIG. 16 is a flow chart showing a sequence of processing by the CPU 401 for controlling a print order of accepted files.

Next, referring to FIGS. 19A to 19D, description is given for the reception of print requests that was described using FIG. 15 and FIG. 16, and how the print list stored in the RAM 402 changes in processing of the print requests.

FIG. 19A shows a case where a print request for "20180222_2312.pdf" received in folder02 (1124) is added to the end of the print list in step S1701. In accordance with the ID "102" assigned to identify the request, a destination folder path, the name of who inputted the request (user name), and a file name which are acquired from the print request are registered, but the file path is not registered because saving of the file is not complete. File reception has completed for a previously accepted "marketing_materials.pdf", and its file path is additionally registered in step S1705.

FIG. 19B shows the print list for when processing of the print request for "marketing_materials.pdf" is started. The print request whose ID is 101 is deleted in step S1802. Even at this time point, since the reception of the file "20180222_2312.pdf" has not completed, the file path is not registered in the print request whose ID is 102. Processing for a print list print request in FIG. 16 ends from step S1801.

FIG. 19C is the print list when the saving of "20180222_2312.pdf" is completed and the file path is additionally registered in the print request whose ID is 102 in step S1705. Print processing of the first print request of the print list is executed in step S1803. FIG. 19D is a print list when a print request for "booklet023.pdf" is newly accepted, and added in step S1701.

The printing apparatus according to the present embodiment transmits a file sorting program that operates on the browser of the client terminal in accordance with a designation by a user. When the file sorting program is accepted from a browser at the same time as a print instruction for a plurality of files, the file sorting program sorts the files and transmits them one by one to the multifunctional peripheral 101 as print requests. The multifunctional peripheral 101 adds a file to the print list as a print request at the timing when the file was received, and starts print processing when saving of the file is completed, so that the order of printing is maintained in the order in which files are received. Therefore, even if a print instruction is issued collectively for a plurality of files, printing can be performed in an order intended by the user.

As described above, the multifunctional peripheral (image forming apparatus) according to the present embodiment is provided with a storage unit that provides a folder with which print setting information is associated, and an image forming unit for forming an image on a sheet. In addition, the image forming apparatus transmits, to an external apparatus, screen information for causing the external apparatus to display a screen for accepting designation of a print file to be transferred to the image forming apparatus in association with a folder, the screen being capable of accepting designation of a plurality of print files at the same time. At the same time, the image forming apparatus transmits to the external apparatus a program for determining a transfer order of the plurality of print files designated by the screen. In addition, the image forming apparatus causes the image forming unit to execute image formation based on print files transferred in association with a folder, the image formation using print setting information and being in the order in which the print files are transferred. In contrast, in the external apparatus (information processing apparatus), an operation screen is displayed on a web browser in accordance with received screen information, and when a plurality of print files are stored in a predetermined folder via the operation screen, the transfer order (in other words, print order) of these files is determined using the received program. Thereafter, the information processing apparatus transmits files that are image forming targets to the image forming apparatus in an order according to the determined image forming order, and the image forming apparatus performs image formation in the order in which files are accepted. As a result, according to the present embodiment, for print jobs that use an in-device (multifunctional peripheral) hot folder, when a plurality of print target files are collectively stored therein, it is possible to perform printing in an order intended by a user without depending on the behavior of the device having the folder.

OTHER EMBODIMENTS

Embodiment(s) of the present invention can also be realized by a computer of a system or apparatus that reads out and executes computer executable instructions (e.g. one or more programs) recorded on a storage medium (which may also be referred to more fully as a 'non-transitory computer-readable storage medium') to perform the functions of one or more of the above-described embodiment(s) and/or that includes one or more circuits (e.g. application specific integrated circuit (ASIC)) for performing the functions of one or more of the above-described embodiment(s) and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-141633 filed on Jul. 27, 2018, which is hereby incorporated by reference herein in its entirety.

What is claimed is:

1. A system in which an information processing apparatus and an image forming apparatus can communicate, wherein
the information processing apparatus comprises:
a first memory device that stores a set of instructions; and
at least one first processor that executes the set of instructions to:
request access to a file system managed by the image forming apparatus;
as a response to the request, receive screen information for causing an external apparatus to display a screen, which is for accepting designation of a print file to be transferred to the image forming apparatus in association with a folder and is capable of accepting designation of a plurality of print files at the same time, and a program for determining a transfer order of the plurality of print files designated by the screen;
display the screen on a web browser in accordance with the screen information; and
in a case where a plurality of print files are stored in the folder via the displayed screen, executes the received program to determine a transfer order of the plurality of print files, and
the image forming apparatus comprises:
a second memory device that stores a set of instructions and a folder with which print setting information is associated; and
at least one second processor that executes the set of instructions to:
in a case where the request is accepted, generate the program in accordance with a predetermined condition designated in advance by a user, and transmit the screen information and the generated program to the information processing apparatus; and
execute image formation, which is based on a print file transferred in association with the folder and uses the print setting information, in an order in which the print file is transferred.

2. The system according to claim 1, wherein
the predetermined condition is at least one of a name order, a size order, and an update date/time order of the plurality of print files stored in the folder.

3. The system according to claim 1, wherein
the operation of storing the plurality of print files on the screen is a drag-and-drop operation.

4. The system according to claim 1, wherein
the screen is further configured to enable an operation for creation of a folder and movement of a folder hierarchy.

5. The system according to claim 1, wherein
the at least one second processor executes instructions in the second memory device to:
accept a request from the external apparatus to perform a print setting for a predetermined folder; and
transmit, to the external apparatus, screen information of a setting screen for performing a print setting of the predetermined folder.

6. The system according to claim 5, wherein
information of the print setting set through the setting screen is saved as a print setting file in the predetermined folder, and
the at least one second processor executes instructions in the second memory device to:
refer to a print setting file saved in a folder, for which an operation is performed, as the print setting information.

7. The system according to claim 5, wherein
the at least one second processor executes instructions in the second memory device to:
in a case where a predetermined request is accepted from the external apparatus, transmit screen information of an authentication screen for performing user authentication of an operator, and in a case where authentication is successful, transmit screen information corresponding to the predetermined request.

8. The system according to claim 1, wherein
the program is JavaScript.

9. The system according to claim 1, wherein
the at least one second processor executes instructions in the second memory device to:
in a case where an image formation request is accepted, add the request to an image formation list and store an image forming target in the memory, and in a case where the storing is complete, register a storage destination of the image forming target in the image formation list, and performs image formation of image forming targets for which a storage destination is registered, in an order of requests registered in the image formation list.

10. The system according to claim 9, wherein an image forming target for which image formation has been started and an image forming target for which storing in the memory has failed are deleted from the image forming list.

11. A method for controlling a system in which an information processing apparatus and an image forming apparatus, which includes a memory operable to provide a folder with which print setting information is associated, can communicate with each other, wherein the method for controlling the information processing apparatus comprises:

requesting access to a file system managed by the image forming apparatus;

as a response to the requesting, receiving screen information for causing an external apparatus to display a screen, which is for accepting designation of a print file to be transferred to the image forming apparatus in association with a folder and is capable of accepting designation of a plurality of print files at the same time, and a program for determining a transfer order of the plurality of print files designated by the screen;

displaying the screen on a web browser in accordance with the screen information, in a case where a plurality of print files are stored in the folder via the displayed screen, determining a transfer order of the plurality of print files using the program, and the method for controlling the image forming apparatus comprising:

upon accepting the request, generating the program in accordance with a predetermined condition designated in advance by a user, and transmitting the screen information and the program to the information processing apparatus;

executing image formation, which is based on print files that have been transferred in association with the folder and uses the print setting information, in an order in which the print files have been transferred.

\* \* \* \* \*